US007277852B2

(12) United States Patent
Iyoku et al.

(10) Patent No.: US 7,277,852 B2
(45) Date of Patent: Oct. 2, 2007

(54) METHOD, SYSTEM AND STORAGE MEDIUM FOR COMMERCIAL AND MUSICAL COMPOSITION RECOGNITION AND STORAGE

(75) Inventors: Miwako Iyoku, Chofu (JP); Tatsuhiro Kobayashi, Matsudo (JP)

(73) Assignee: NTT Communications Corporation, Tokyo (JP)

( * ) Notice: Subject to any disclaimer, the term of this patent is extended or adjusted under 35 U.S.C. 154(b) by 853 days.

(21) Appl. No.: 10/399,406

(22) PCT Filed: Oct. 22, 2001

(86) PCT No.: PCT/JP01/09244

§ 371 (c)(1),
(2), (4) Date: Apr. 23, 2003

(87) PCT Pub. No.: WO02/35516

PCT Pub. Date: May 2, 2002

(65) Prior Publication Data

US 2004/0055445 A1    Mar. 25, 2004

(30) Foreign Application Priority Data

Oct. 23, 2000   (JP)   ............... 2000-323022
Nov. 29, 2000   (JP)   ............... 2000-363883

(51) Int. Cl.
*G10L 15/00*    (2006.01)
*G06F 7/00*     (2006.01)
(52) U.S. Cl. ..................... 704/236; 707/104.1
(58) Field of Classification Search ........... 704/231, 704/232, 236
See application file for complete search history.

(56) References Cited

U.S. PATENT DOCUMENTS

| 2,761,897 | A | * | 9/1956 | Jones ................. 704/225 |
| 2,947,971 | A |   | 8/1960 | Glauberman et al. |
| 3,919,479 | A |   | 11/1975 | Moon et al. |
| 4,230,990 | A |   | 10/1980 | Lert, Jr. et al. |
| 4,450,531 | A |   | 5/1984 | Kenyon et al. |
| 4,677,466 | A |   | 6/1987 | Lert, Jr. et al. |
| 4,739,398 | A |   | 4/1988 | Thomas et al. |
| 4,843,562 | A |   | 6/1989 | Kenyon et al. |

(Continued)

FOREIGN PATENT DOCUMENTS

EP    0 248 533    12/1987

(Continued)

*Primary Examiner*—David Hudspeth
*Assistant Examiner*—Justin W Rider
(74) *Attorney, Agent, or Firm*—Oblon, Spivak, McClelland, Maier & Neustadt, P.C.

(57) ABSTRACT

A playlist generating method for generating a playlist of content from received broadcasted data is provided. The playlist generating method includes the steps of: extracting features of broadcast content beforehand, storing the features in a content feature file, and storing information relating to the broadcast content in a content information DB; extracting features from the received data, and storing the features in a data feature file; searching for broadcast content of a predetermined kind by comparing data in the content feature file and data in the data feature file; when a name of the predetermined kind of content is determined, storing data corresponding to the broadcast content of the predetermined kind in a search result file; generating a playlist for the broadcast content of the predetermined kind from the search result file and the content information DB.

21 Claims, 21 Drawing Sheets

U.S. PATENT DOCUMENTS

| | | | |
|---|---|---|---|
| 5,436,653 A | 7/1995 | Ellis et al. | |
| 5,437,050 A | 7/1995 | Lamb et al. | |
| 5,504,518 A | 4/1996 | Ellis et al. | |
| 5,577,266 A * | 11/1996 | Takahisa et al. | 455/3.06 |
| 5,724,605 A * | 3/1998 | Wissner | 715/500.1 |
| 5,812,937 A * | 9/1998 | Takahisa et al. | 455/66.1 |
| 5,918,223 A * | 6/1999 | Blum et al. | 707/1 |
| 6,121,530 A | 9/2000 | Sonoda | |
| 6,192,340 B1 * | 2/2001 | Abecassis | 704/270 |
| 6,332,120 B1 * | 12/2001 | Warren | 704/235 |
| 6,437,227 B1 | 8/2002 | Theimer | |
| 2002/0007354 A1 * | 1/2002 | Deguchi | 704/418 |
| 2004/0199387 A1 * | 10/2004 | Wang et al. | 704/243 |
| 2005/0081159 A1 * | 4/2005 | Gupta et al. | 715/751 |

FOREIGN PATENT DOCUMENTS

| | | |
|---|---|---|
| EP | 1 093 109 | 4/2001 |
| JP | 6-6833 | 1/1994 |
| JP | 6-44752 | 2/1994 |
| JP | 7-79206 | 3/1995 |
| JP | 8-149099 | 6/1996 |
| JP | 9-214875 | 8/1997 |
| JP | 63-56091 | 3/1998 |
| JP | 10-308921 | 11/1998 |
| JP | 11-120198 | 4/1999 |
| JP | 11-122203 | 4/1999 |
| JP | 11-205256 | 7/1999 |
| JP | 11-238088 | 8/1999 |
| JP | 2000-149434 | 5/2000 |
| JP | 2000-155759 | 6/2000 |
| JP | 2000-312343 | 11/2000 |
| JP | 2000-347659 | 12/2000 |
| JP | 2000-347689 | 12/2000 |
| JP | 2001-60099 | 3/2001 |
| JP | 2001-326952 | 11/2001 |
| JP | 2001-358682 | 12/2001 |

* cited by examiner

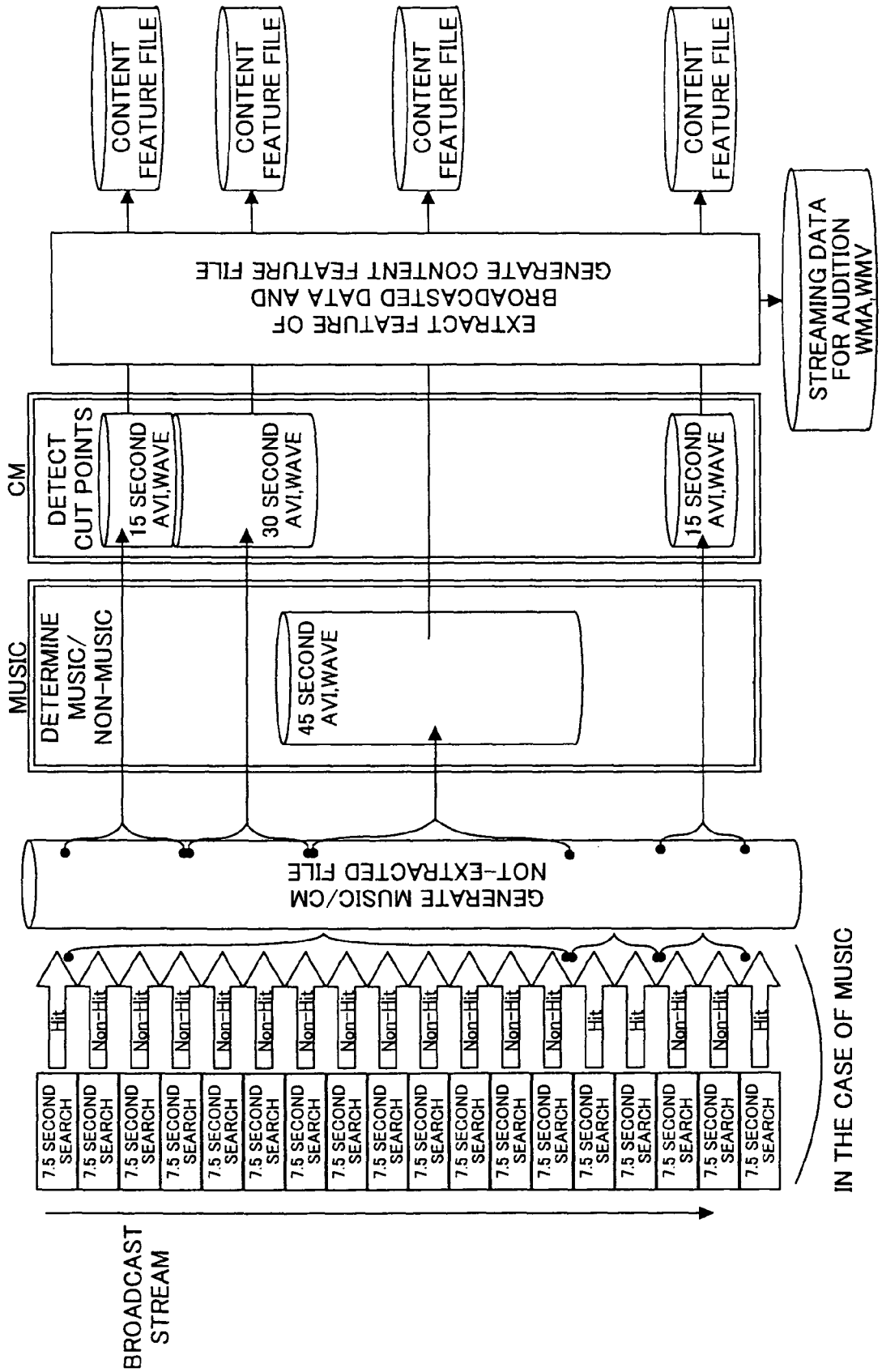

METHOD, SYSTEM AND STORAGE MEDIUM FOR COMMERCIAL AND MUSICAL COMPOSITION RECOGNITION AND STORAGE

TECHNICAL FIELD

The present invention relates to a music recognizing method, system and a recording medium storing a music recognizing program. More particularly, the present invention relates to a music recognizing method, system and a recording medium storing music recognizing program for recognizing and storing, in real time, a name of broadcasted music from images or voice information that is broadcasted on TV or FM and the like.

In addition, the present invention relates to a CM (commercial) recognizing method and system and a recording medium storing a CM recognizing program. More particularly, the present invention relates to a CM recognizing method, system and a recording medium storing a CM recognizing program for recognizing and storing, in real time, broadcasted CM from images or voice information broadcasted on TV or FM and the like.

BACKGROUND ART

Conventionally, there is no system for recognizing a music name used in content of image information or music information broadcasted in real time, and storing the music name in a storage.

In addition, there is no apparatus for recognizing and storing a CM broadcasted in real time. In addition, there is no system for comparing and recognizing CM data only by using CM information separated at predetermined intervals.

As mentioned above, according to the conventional system, there is no technique to monitor broadcasted music, so that the music name cannot be stored in a storage with time information when the music is broadcasted. The time information can be assigned to a music name only by manually, so that the name of the broadcasted music and the broadcasted time information cannot be provided in real time.

In addition, as to CM, there is no apparatus for recognizing and storing a broadcasted CM from broadcasted images or voice information in real time. This can be performed manually, so that there is a limit for real time capability and expansion of scale.

DISCLOSURE OF THE INVENTION

The present invention is contrived in consideration of the above-mentioned problems. An object of the present invention is to provide a playlist generating technique for recognizing and storing a music name of broadcasted music from images and voice information that are broadcasted on TV and FM and the like.

Another object of the present invention is to provide a playlist generating technique for comparing and recognizing target music data in real time without tag information or watermark information, not only for data on the air but also for broadcasted data of streaming via communication network such as the Internet.

Further, an object of the present invention is to provide a CM recognizing technique for recognizing and storing broadcasted. CM in real time from images and voice information on the air on TV and FM and the like.

The above object can be achieved by a playlist generating method for generating a playlist of content from received data, the playlist generating method including the steps of:

extracting features of content beforehand, storing the feature in a content feature file, and storing information relating to the content in a content information DB;

extracting features from the received data, and storing the features in a data feature file;

searching for content by comparing data in the content feature file and data in the data feature file;

when the data in the content feature file matches the data in the data feature file, data corresponding to the matched data is stored in a search result file; and generating a playlist for the content from the search result file and the content information DB.

According to the present invention, the time-series playlist can be generated automatically from broadcasted data on the air and the like. The data feature file is, for example, a broadcast feature file.

In the above configuration, the method may further includes the step of, when data in the data feature file is not included in the content feature file, registering the data in the content feature file.

According to the present invention, data can be automatically registered to the content feature file.

The method may further include the steps of:

making content corresponding to the data that is not included in the content feature file to be watched or listened to by a person; and registering information relating to the content in the content information DB.

According to the present invention, information relating to data in the content feature file that is automatically registered can be registered. By using the registered information, the time-series playlist can be automatically generated.

The method may further include the steps of:

when data in the data feature file is not included in the content feature file, making content corresponding to the data to be watched or listened to by a person;

adding the content to the playlist with information related to the content.

According to the present invention, the time-series playlist can be complemented, so that more accurate playlist can be generated.

The above object can be also achieved by a music recognizing method for recognizing music from received data, the method including the steps of:

extracting features of music content beforehand, storing the features in a content feature file;

extracting features from the received data, and storing the features in a broadcast feature file;

searching for music by comparing data in the content feature file and data in the broadcast feature file;

when a music name is determined, the music name is stored in a search result file; and generating a playlist of music from the search result file.

According to the present invention, the time-series playlist on music can be automatically generated.

The method may further include the steps of:

determining whether the received data is music or not;

if the data is music, storing information indicating that the data is music and the time when the data is received in a music extracted file;

if a music name for data in the broadcast feature file is not determined in the step of searching for music, storing the data in a music name not-extracted file; and generating a music not-detected file from the broadcast feature file, the music extracted file and the music name not-extracted file.

According to the present invention, data that is music but not included in the time-series playlist can be grasped.

The method may further include the steps of:

making the music stored in the music not-detected file to be listened to by a person;

adding a music name and time of the music stored in the music not-detected file in the playlist.

According to the present invention, the time-series playlist can be complemented, so that more accurate playlist can be generated.

The method may include the step of generating the time-series playlist by using the search result file and the content information DB including information associated with the music name, wherein the time-series playlist includes time, a name of music broadcasted at the time and information related to the name.

According to the present invention, the time-series playlist including a music name and information relating to the music name can be generated automatically.

The method may include the steps of:

receiving broadcasted data in a plurality of areas;

sending data received in each area to a center system;

generating the time-series playlist by using the music recognizing method in the center system.

According to the present invention, the time-series playlist relating to content broadcasted in broadcasting stations in each area can be generated automatically.

The above object can be also achieved by a music recognizing method for recognizing music from received data, the method including the steps of:

extracting features of music content beforehand, storing the features in a content feature file;

receiving broadcasted data in a plurality of areas;

extracting features from the received data, and sending the features as data of a broadcast feature file to a center system in each area;

in the center system, searching for music by comparing data in the content feature file and data in the broadcast feature file;

if a music name is determined, the music name is stored in a search result file; and generating a playlist of music from the search result file.

According to the present invention, since the broadcast feature file is generated in each area and is sent to the center, transmission amount to the center can be decreased.

In the music recognizing method, each of the content information DB and the information related to the music name includes information related to a CM, and the information related to the CM in the content information DB is registered in the content information DB beforehand by the CM recognizing method, the CM recognizing method further including the steps of:

detecting CM data from the received data;

extracting features of the CM data, and storing the features in the broadcast feature file;

performing data comparison between the broadcast feature file and a master CM content feature file in which features of CM content are stored beforehand; and if data in the broadcast feature file does not exist in the master CM content feature file, registering the data in the master CM content feature file included in the content information DB as a new CM.

According to the present invention, the time-series playlist including CM information can be generated.

The above object can be also achieved by a CM recognizing method for recognizing a CM from received data, and storing recognized CM data, the method including the steps of:

detecting CM data from the received data;

extracting features of the CM data, and storing the features in a broadcast feature file;

performing data comparison between the broadcast feature file and a master CM content feature file in which features of CM content are stored beforehand; and if data in the broadcast feature file does not exist in the master CM content feature file, registering the data in the master CM content feature file as a new CM.

According to the present invention, CM monitoring which was conventionally performed manually can be performed automatically, so that CM data applicable foe generating the time-series playlist can be provided.

In the CM recognizing method, the step of detecting the CM data from the received data may include the step of detecting a start point and an end point of the CM data, wherein, when the features of the CM data are extracted, a part of the CM data is cut out to a predetermined length, such that a length from the center of the CM data to an end is the same as a length from the center to another end.

According to the present invention, input error of the CM data can be absorbed.

The method may further include the steps of:

displaying CM data that does not exist in the master CM content feature file as a result of the data comparison; and registering information relating to the CM data in each database in a CM management database group including the master CM content feature file.

According to the present invention, information relating to CM data that is automatically registered can be registered in the master CM content feature file. By using this information, the time-series playlist including information on CM can be generated. Other objects, features and advantages of the present invention will become more apparent from the following detailed description when read in conjunction with the accompanying drawings.

BRIEF DESCRIPTION OF THE DRAWINGS

FIG. 21 shows processes for generating the content feature file from the music/CM not-extracted file.

PREFERRED EMBODIMENTS FOR CARRYING OUT THE INVENTION

First Embodiment

Figure 1:
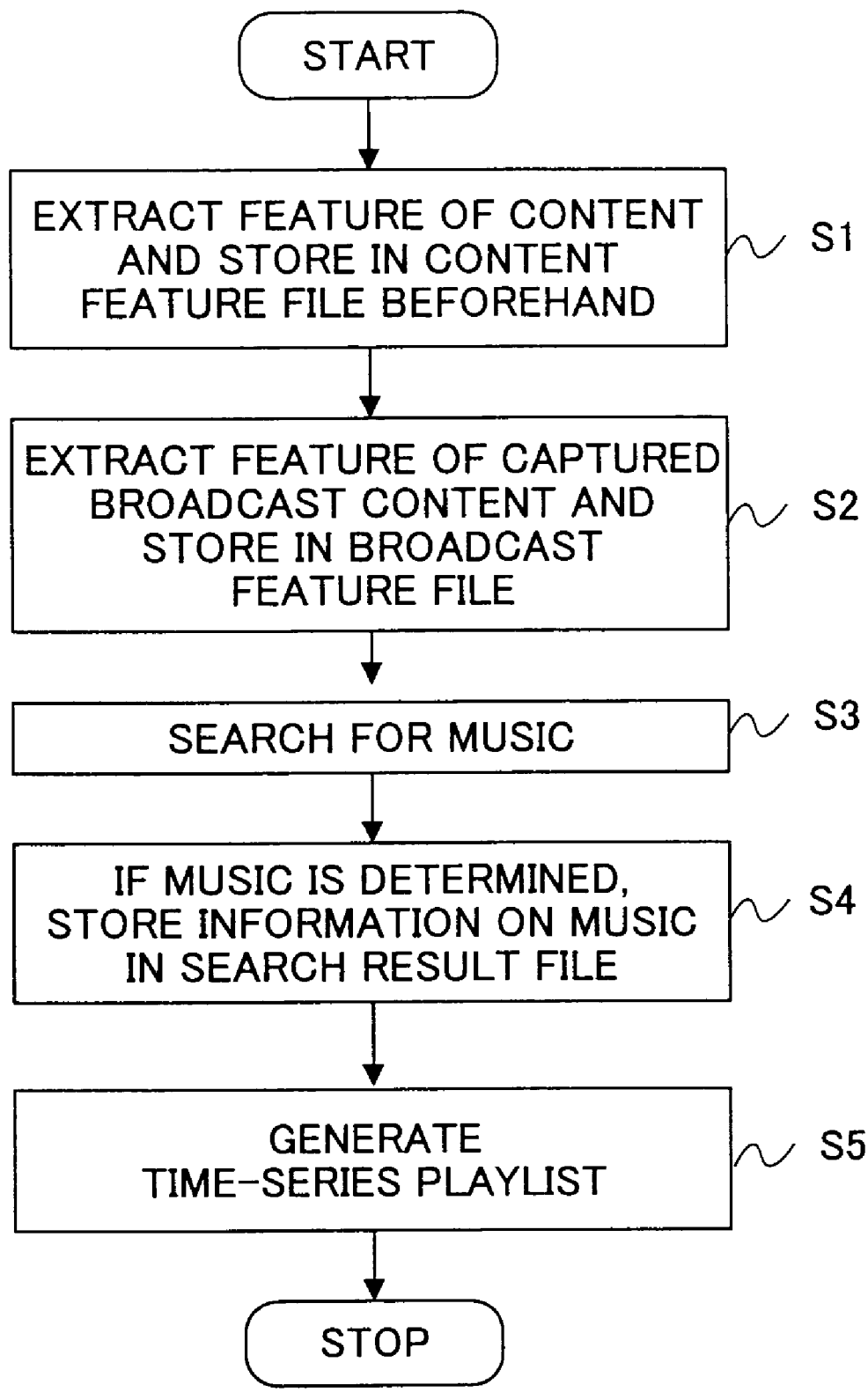
FIG. 1 is a figure for explaining the principle of the present invention.
Figure 2:
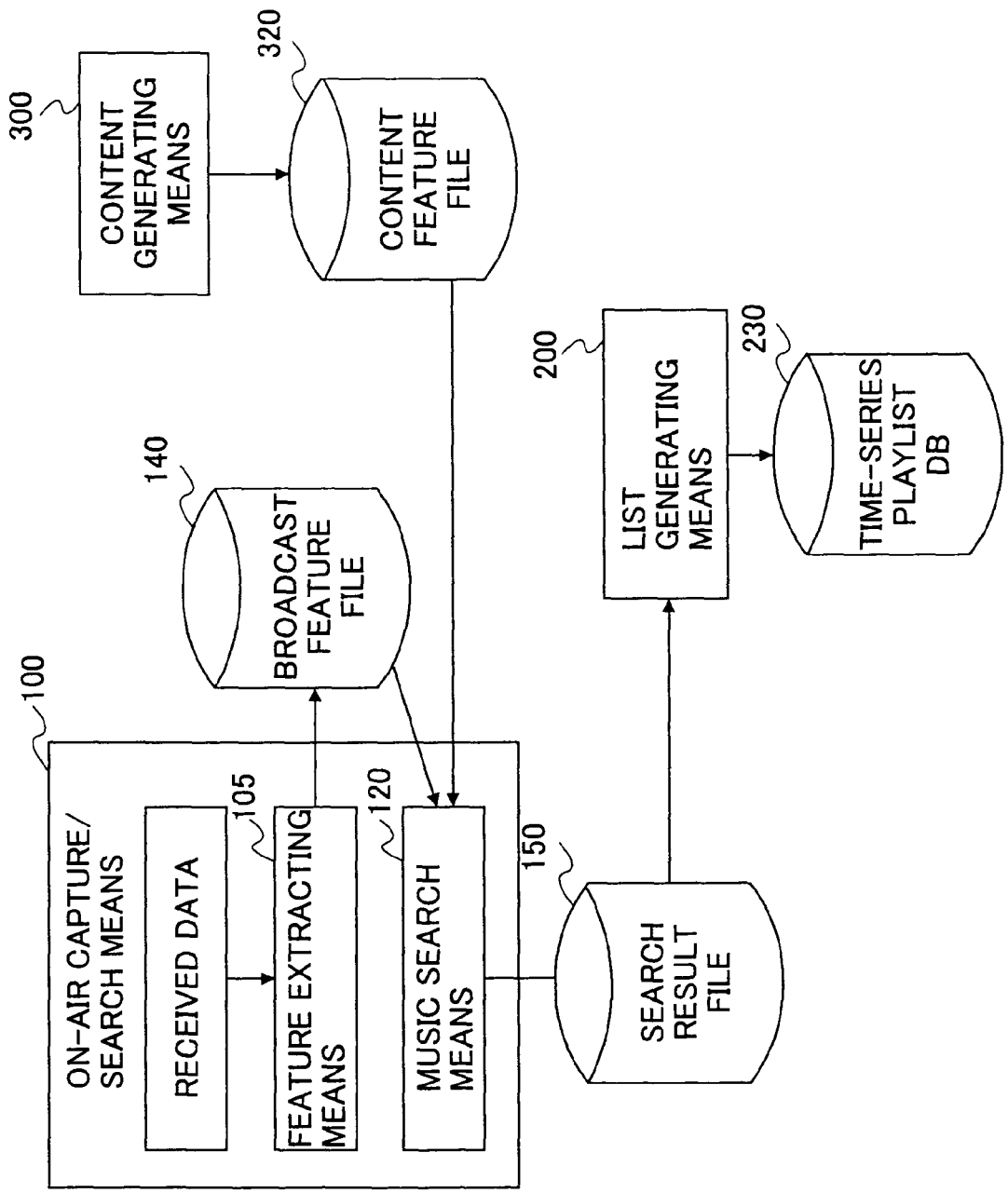
FIG. 2 shows the principle configuration of the present invention.

FIGS. 1 and 2 show the principle of the present embodiment.

As shown in FIG. 1, in this embodiment, features of content are extracted beforehand, and the features are stored in a content feature file (step 1). A feature of received data is extracted and the feature is stored in a broadcast feature file (step 2). Music is searched for by comparing data of the content feature file and data of the broadcast feature file (step 3). When the music is searched for, information on the music is stored in a search result file (step 4). Then, a time-series playlist of music is generated from the search result file and is stored (step 5).

As shown in FIG. 2, the principle configuration of the music recognizing system of the present embodiment includes a content generating means 300 for generating content beforehand, extracting the features of music content and storing the features in a content feature file 320, a feature extracting means 105 for extracting a feature of received data and storing it in a broadcast feature file 140, a music search means 120 for searching for music by comparing data of the content feature file 320 and the broadcast feature file 140 and storing the search result in a search result file 150, and a list generating means 200 for generating a time-series playlist from the search result file 150 and storing it.

Figure 3:
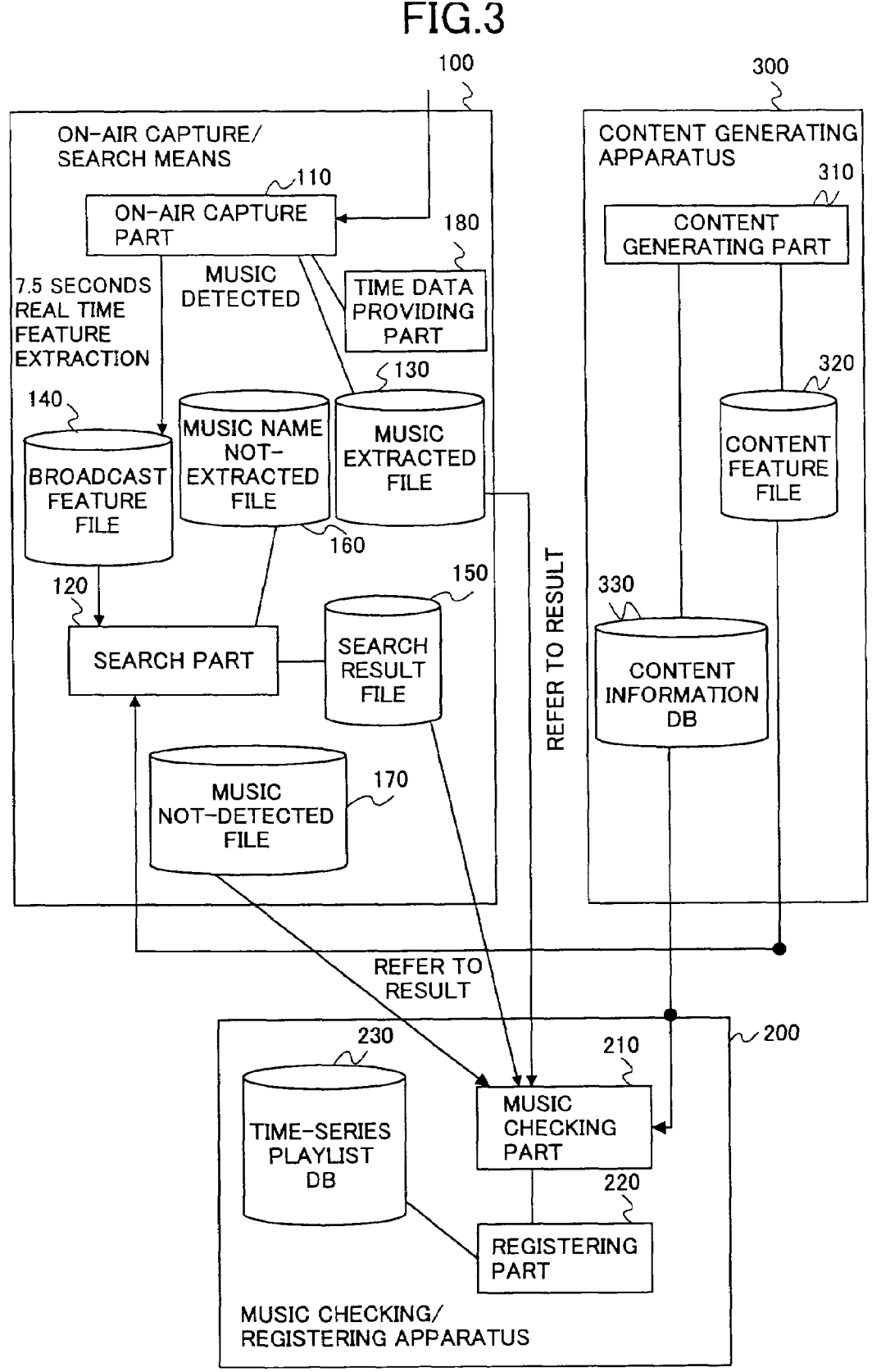
FIG. 3 shows an outline of a music recognizing system of the present invention.

FIG. 3 shows an outline of the music recognizing system of the present invention. The system shown in the figure includes an on-air capture/search apparatus 100, a music recognizing/registering apparatus 200, and a content generating apparatus 300. These apparatuses are realized by PCs and the like. Although the present system can be realized by one PC that includes the functions of the present invention, the system includes the three apparatuses in consideration of process loads of PC, performance cost, specification of current hardware and the like in the embodiment of the present invention.

The on-air capture/search apparatus 100 includes an on-air capture part 110, a search part 120, a music extracted file 130, a broadcast feature file 140, a search result file 150, a music name not-extracted file 160, a music not-detected file 170, and a time data providing part 180.

The on-air capture part 110 successively monitors broadcasted data from TV, radio broadcasting station, determines whether the monitored broadcasted data is music or non-music. When the data is music, the on-air capture part 110 records that the broadcasted data at the time of monitoring is music in the music extracted file 130, and extracts the feature of the broadcasted data in real time at intervals of 7.5 seconds, and stores the features in the broadcast feature file 140. In addition, the music is stored as digital data in a file (not shown in the figure) at intervals of 7.5 seconds. The on-air capture part 110 performs the above-mentioned processes on the basis of time information from the time data providing part 180. In addition, time stamp is provided to the captured information and the captured information is stored with the time stamp.

As for the reason for using the interval of 7.5 seconds for detecting music in a CM, since the time length of a CM is 15 seconds at the minimum currently, the search of music data can be performed with reliability by using a half of the length as the search interval.

The determination whether music or non-music in the on-air capture part 110 can be realized by using a conventional technology for determining whether music or non-music (for example, talk and the like), for example, the conventional technology is "Gakuran" (music/non-music detection technology): Japanese patent application No. 8-340293, Japanese patent application No. 10-68158 and the like. The on-air capture part 110 registers information indicating that the data is determined to be music in the music extracted file 130 by using the technology.

The search part 120 reads, in a memory, the file in which features of content generated by the content generating apparatus 300, and reads the broadcast feature file 140. Then, the search part 120 performs matching between the two files and stores the result of matching in the search result file 150. Data that does not succeed in the matching is stored in the music name not-extracted file 160.

As for the above-mentioned search by matching, a learning active search method that is described in Japanese patent No. 3065314 "High speed signal search method, apparatus and recording medium" can be used. In this method, a similarity value between data of the content feature file and data in the broadcast feature file, and the similarity value is compared with a threshold, so that the search is performed. The Japanese patent No. 3065314 can be referred to for the details of the search method.

The music extracted file 130 includes data of the information indicating music with a time stamp. The broadcast feature file that is generated by the on-air capture part 110 is a TAZ file (binary file). The TAZ file is a file that enables high speed comparison in the learning active search.

The broadcasted content is stored in a WAV file and the like (not shown in the figure).

The on-air capture part 110 automatically captures broadcasted data on the air, and feature data of the broadcasted data is stored in the broadcast feature file 140.

Data that is music but that is not detected as music by matching is extracted from the music extracted file 130, the music name not-extracted file 160 and the broadcast feature file 140, and the data is stored in the music not-detected file 170.

The search result file 150 stores the result of matching between the content feature file (after mentioned) generated by the content generating apparatus 300 and the broadcast feature file 140. That is, as a result of matching, information (music name and the like) corresponding to matched data is stored in the search result file, and a piece of data of the broadcast feature file 140 that does not exist in the content feature file is stored in the music name not-extracted file (after mentioned).

The music checking/registering apparatus 200 includes a music checking part 210 and a registering part 220, and outputs the time-series playlist 230.

The music checking part 210 extracts time, music name, artist, program (CM) name, client, product, talent, CD information and the like corresponding to recognized music by using the search result file 150 and the content information DB 330, and passes them to the registering part 220.

The registering part 220 registers information extracted by the music checking part 210 in the time-series playlist file 230 in the order of time.

In addition, an operator checks broadcasted content stored in the music not-detected file by using the music checking/registering apparatus 200, so that the music is recognized and the data is added to the time-series playlist. The operator listens to the music on the basis of time information in the music not-detected file in which the music is captured by the on-air capture part 110 in the form of WAV file and the like, so that the operator can recognize the broadcasted content.

The content generating apparatus 300 includes a content generating part 310, a content feature file 320 and a content information DB 330.

The content generating part 310 obtains content from a medium in which music is recorded, stores the music and attribute data that can be applied to the content feature file 320 in the content information database 330. In addition, the content generating part 310 extracts the features of the music, and stores the features in the content feature file 320 with the music names.

The content feature file 320 is a file generated in the content generating part 310, and stores music names and feature information corresponding to the music.

The content information DB 330 stores all attribute data of music by the content generating part 310.

Figure 4:
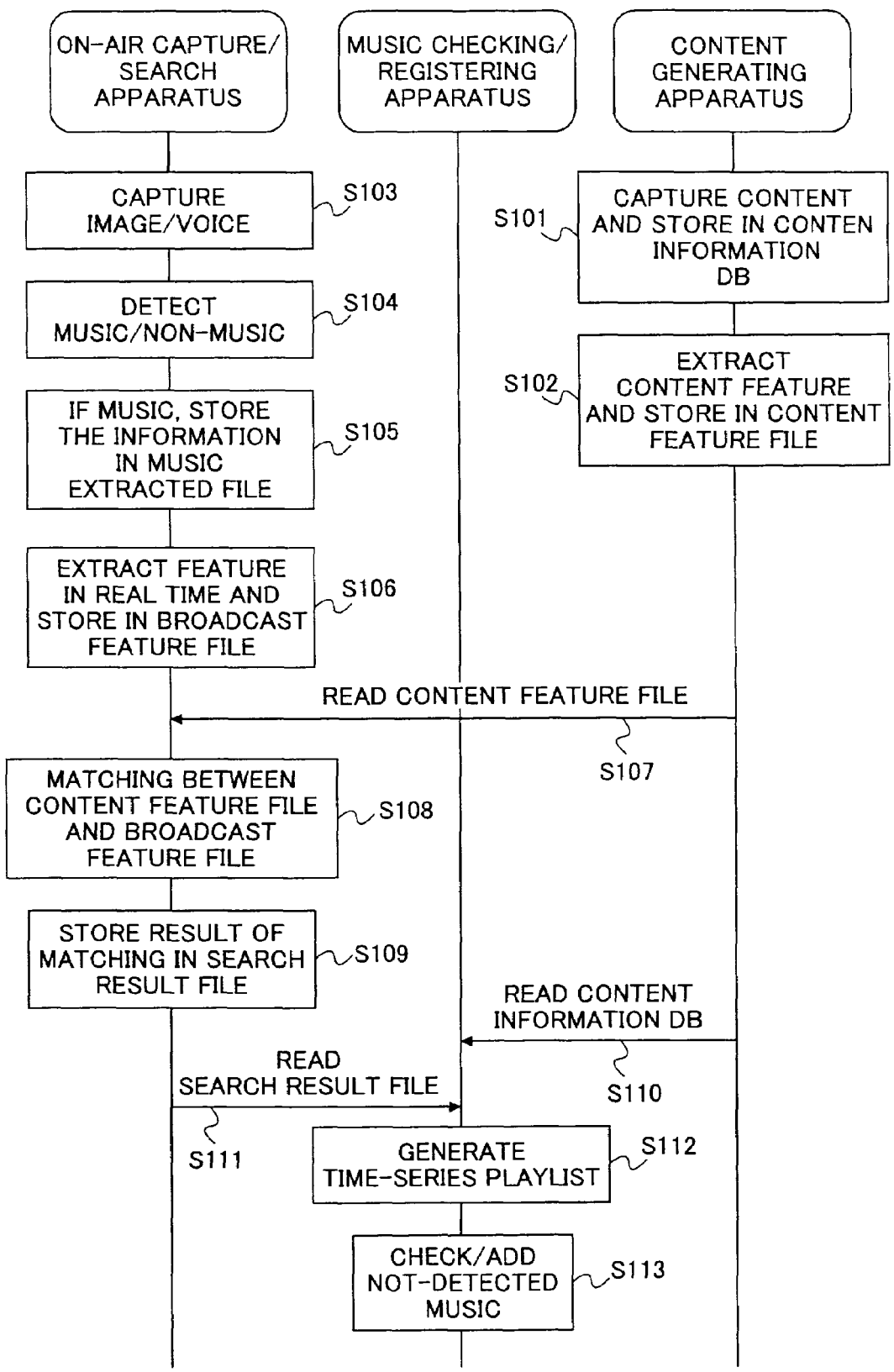
FIG. 4 is a flowchart showing an outline of the operation of the music recognizing system of the present invention.

Next, the operation of the music recognizing system of the present invention will be described. FIG. 4 shows an outline of the operation of the music recognizing system of the present invention.

Step 101) The content generating apparatus 300 registers music and attribute data of the music from a recording medium and the like of music content in the content information DB 330. The attribute data are, for example, music name, artist name, program name, client name, product name, talent name and the like.

Step 102) The content generating apparatus 300 extracts the features of music and stores the features in the content feature file 320.

The processes so far are pre-processes for following processes.

Step 103) The on-air capture/search apparatus 100 captures images or voices on the air. The "images or voices on the air" include images or voices broadcasted via the Internet.

Step 104) The on-air capture/search apparatus 100 determines whether the captured broadcasted data is music or non-music by using a technique for determining whether music/non-music.

Step 105) When the data is music in step 103, information indicating that the broadcasted data at the time is music is recorded in the music extracted file 130. "Recording information indicating that the broadcasted data at the time is music" is, for example, providing a flag indicating music at the time.

Step 106) At the same time of the steps 104 and 105, the feature of the music is extracted at intervals of 7.5 seconds and the feature is stored in the broadcast feature file 140. In addition, broadcasted data of music is stored in a file (not shown in the figure).

Step 107) Next, the on-air capture/search apparatus 100 launches an application for searching for music, and reads information in the content feature file 320 that was generated by the content generating apparatus in step 102 in a memory.

Step 108) The search part 120 of the on-air capture/search apparatus 100 also reads the broadcast feature file 140, and performs matching between the two files. At this time, the before-mentioned learning active search technology is used.

Step 109) The result of the matching is stored in the search result file 150. The feature data that fails in the matching is stored in the music name not-extracted file 160.

Step 110) Next, the music checking/registering apparatus 200 reads each piece of data in the content information DB 330 from the content generating apparatus 300.

Step 111) In addition, the music checking/registering apparatus 200 reads the search result file 150 from the on-air capture/search apparatus 100.

Step 112) Accordingly, the music checking/registering apparatus 200 extracts information such as music name, artist name, captured program, client, product, talent and the like, from data in the search result file 150 and data in the content information DB 330, sorts these pieces of information in time series, so as to generate a time series playlist and stores it as the time series playlist DB 230.

Step 113) In addition, the operator checks the music name corresponding to feature data stored in the music not-detected file by listening to the music, so that the time series playlist is complemented.

Second Embodiment

Next, as the second embodiment of the present invention, a CM recognizing system for recognizing and storing CM (commercial) from broadcasted images or voice information on the air on TV or FM/AM will be described. By referring to CM data generated by the CM recognizing system, a playlist that includes CM data can be generated from the music recognized in the first embodiment.

Figure 5:
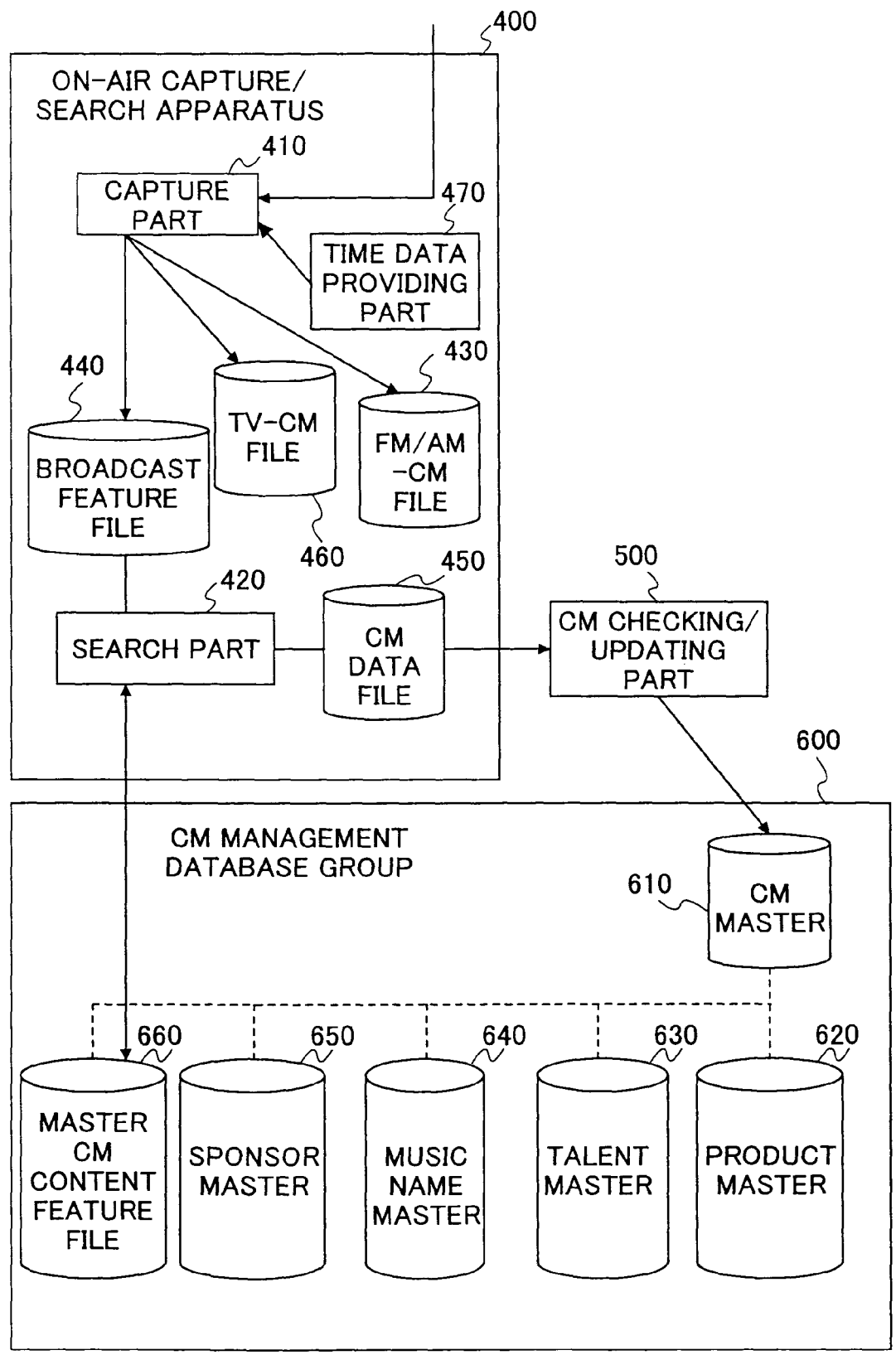
FIG. 5 is a figure showing an outline of the CM recognizing system of the present invention.

FIG. 5 shows an outline of the CM recognizing system of the present invention.

The CM recognizing system shown in the figure includes an on-air capture/search apparatus 400, a CM checking/updating part 500 and a CM management database group 600.

The on-air capture/search apparatus 400 includes a capture part 410, a search part 420, an FM/AM-CM file 430, a broadcast feature file 440, a CM data file 450 and a TV-CM file 460 and a time data providing part 470.

The capture part 410 successively monitors broadcasted data on the air from a TV or radio broadcasting station, determines whether the broadcasted data is a CM or not by determining start and end of the CM. When the broadcasted data is a CM, the monitored CM data is stored in the TV-CM file 460, or stored in the FM/AM-CM file 430. In addition, the capture part 410 provides a time stamp to the CM data by using time information provided from the time data providing part 470.

Further, the capture part 410 generates feature data of CM from captured data and stores the feature data in the broadcast feature file 440. As described later, when the feature file 440 is generated, in order to absorb an error of cut points of data cut out by using start and end of the CM, the both ends of the CM data are cut out such that both lengths from the center to the ends are the same and the length of the reprocessed CM data becomes a constant length (8.0 seconds). The reprocessed on-air data are processed into feature data by using the learning active search technology, and the feature data is stored as the TAZ format. The TAZ file is a file that enables high speed comparison processing in the learning active search.

The search part 420 reads, in the memory, the broadcast feature file 440 and a file, in a master CM management database group 600, in which features of CM are stored. Then, the search part 420 performs matching between the two files, and stores the matching result in the CM data file 450. The search part 420 uses the learning active search (Japanese patent No. 3065314 and the like). In this case, as for cut-out CM data in which any CM can not be detected, as a matching result, the CM data is stored in the CM data file 450 in which on-air time is provided as the name of the CM data.

The FM/AM-CM file 430 stores, as a file of WAV format (only voice format), CM data captured by the capture part 410 and that was on the air by FM/AM.

The broadcast feature file 440 stores feature data of the CM extracted from the CM data captured by the capture part 410. In addition, the broadcast feature file 440 is a TAZ file (binary file).

The TV-CM file 460 stores, as a file of AVI format, CM data captured by the capture part 410 that was broadcasted on TV.

The CM checking/updating part 500 reads the CM data file 450 that stores CM data in which the CM name and the like is not determined. There is a high probability that the CM in the CM data file 450 is a new CM. Thus, the operator checks a newly registered CM, and extracts sponsor (client), product name, music name, talent name and the like, and stores them in files of the CM management database group 600.

The CM management database group 600 includes a CM master 610, a product master 620, a talent master 630, a music name master 640, a sponsor master 650, and a master CM content feature file 660. Data in the product master 620, the talent master 630, the music name master 640, the sponsor master 650, and the master CM content feature file 660 are extracted by the CM checking/updating part 500. In addition, these masters are master files generated for each attribute of the CM data stored in the CM master 610.

Next, the operation of the above-configuration will be described.

Figure 6:
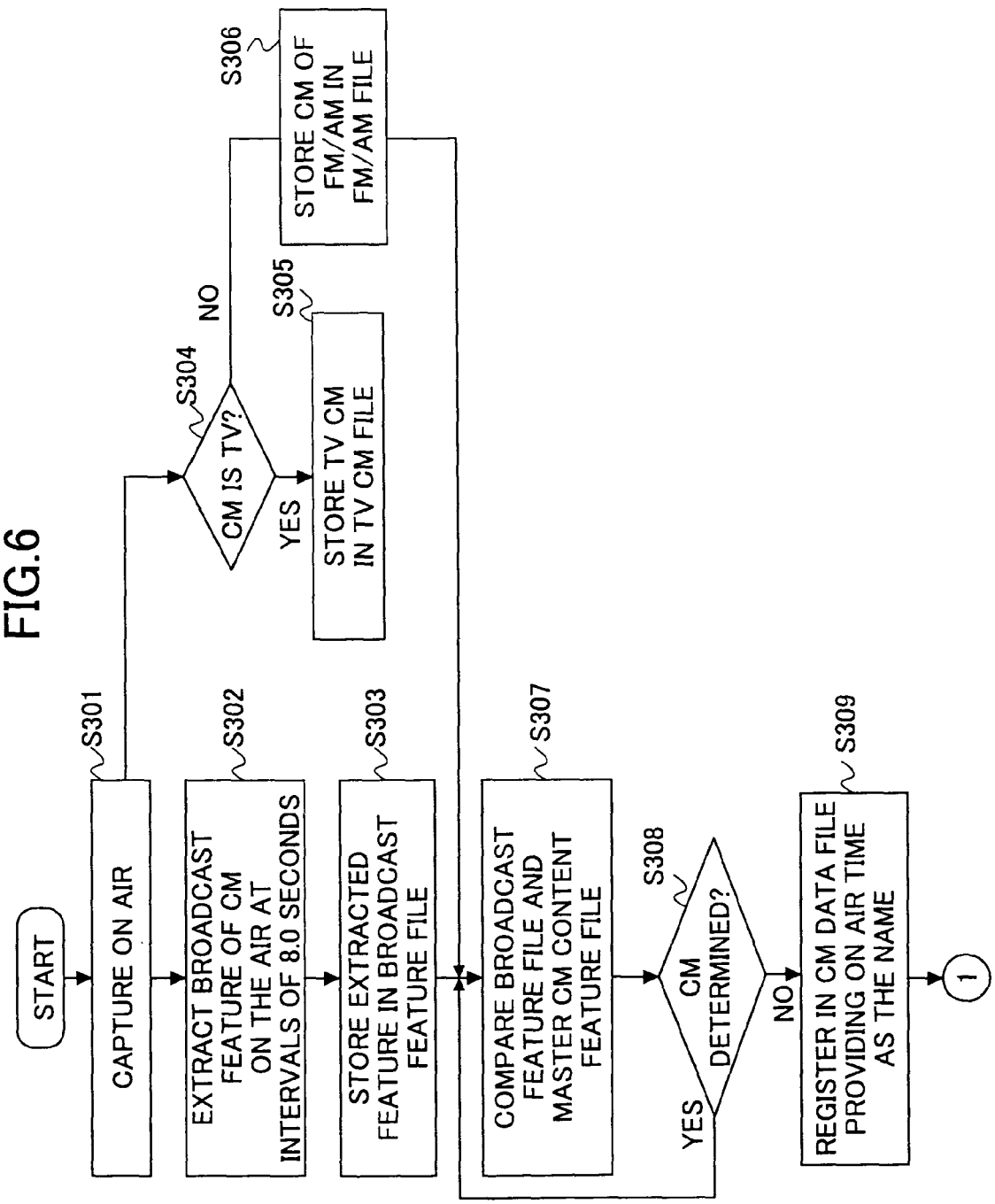
FIG. 6 is a (first) flowchart showing an outline of the operation of the CM recognizing system of the present invention.
Figure 7:
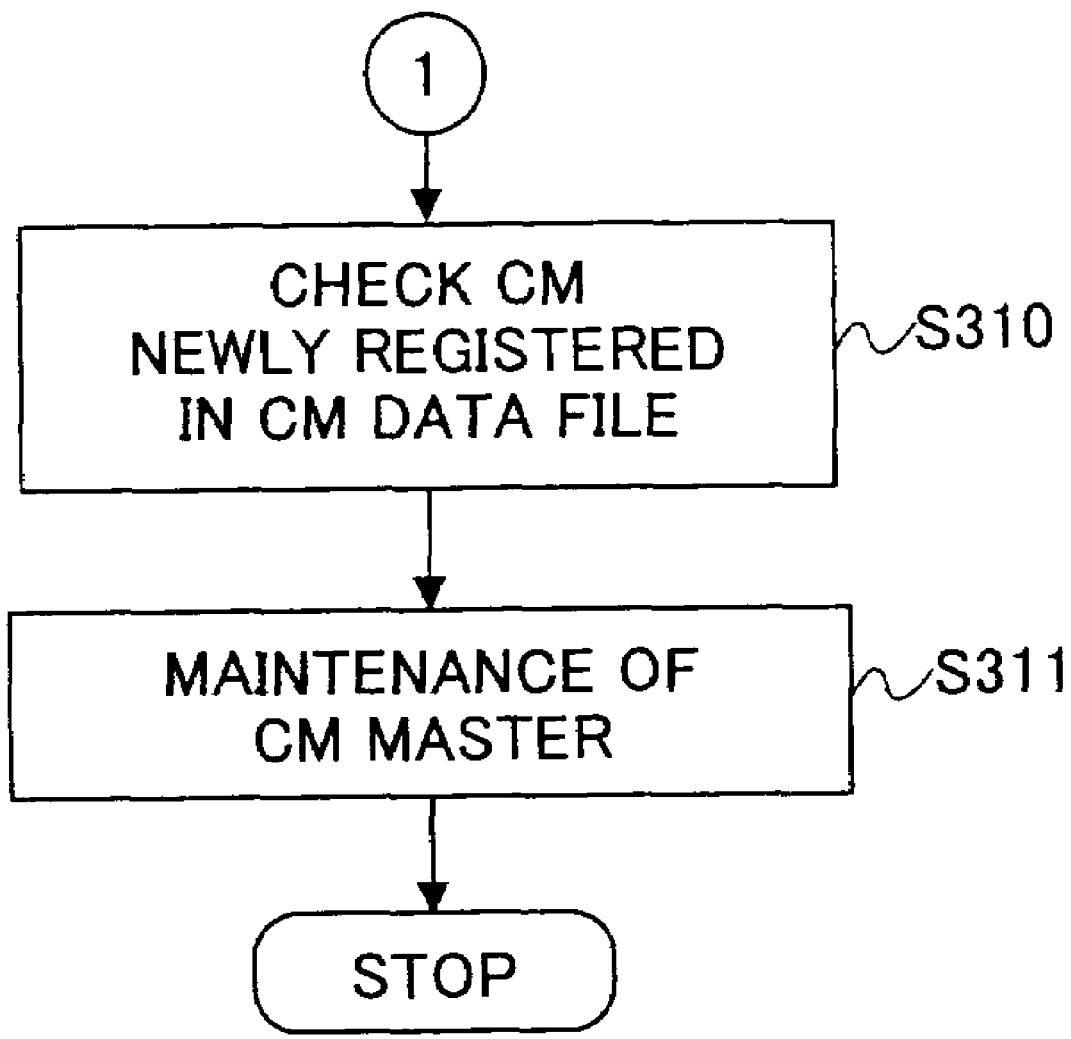
FIG. 7 is a (second) flowchart showing an outline of the operation of the CM recognizing system of the present invention.

FIGS. 6 and 7 shows flowcharts showing an outline of the operation of the CM recognizing system of the present invention.

Step 301) The capture part 410 of the onair capture/search apparatus 400 captures broadcasted data on the air.

Step 302) The capture part 410 detects CM data from the captured broadcasted data, and extracts the feature by using the before-mentioned method from the CM data.

Step 303) The extracted feature is stored in the broadcast feature file 440, and goes to step 307.

Step 304, 305) In addition to performing the above-mentioned processes, TV-CM is stored in the TV-CM file 460.

Step 306) In addition, when the extracted CM is a CM that was on the air by FM/AM, the CM is stored in the FM/AM-CM file 430.

Step 307) After the step 303, the search part 420 reads, in the memory, the broadcast feature file 440 and the master CM content feature file 660 of the CM management database group 600, and performs the learning active search in which the two files are compared.

Step 308) By performing the search, if a CM is determined, the process goes to step 307, then, next search is performed for the data of the broadcast feature file 440 and the master CM content feature file 660. If the CM is not determined, the process goes to the step 309.

Step 309) If a CM is not determined, the. data is registered in the CM data file by providing on-air time as the name.

Step 310) The operator checks the CM registered in the CM data file 450 by using a conventional software and the like by using the CM checking/updating part 500.

Step 311) The operator performs maintenance of the CM master 610, and performs maintenance of masters for each attribute from the CM master 610.

Accordingly, a new CM can be registered in the database.

Third Embodiment

In the same way as the first embodiment in which the time series playlist is generated from the recognized music, the time series playlist can be generated from the CM recognized in the second embodiment.

In addition, in the same way as the example of the CM in the second embodiment, it is possible to update the content feature file and content information DB of music.

Further, it is possible to update the content feature file and the content information DB on CM or music in the same way as the second embodiment while generating the time series playlist in the same way as the first embodiment. The concrete example will be described later.

In the following, concrete examples for the above-mentioned embodiments will be described with reference to figures.

EXAMPLE (First Example) Corresponding to the First Embodiment

Figure 8:
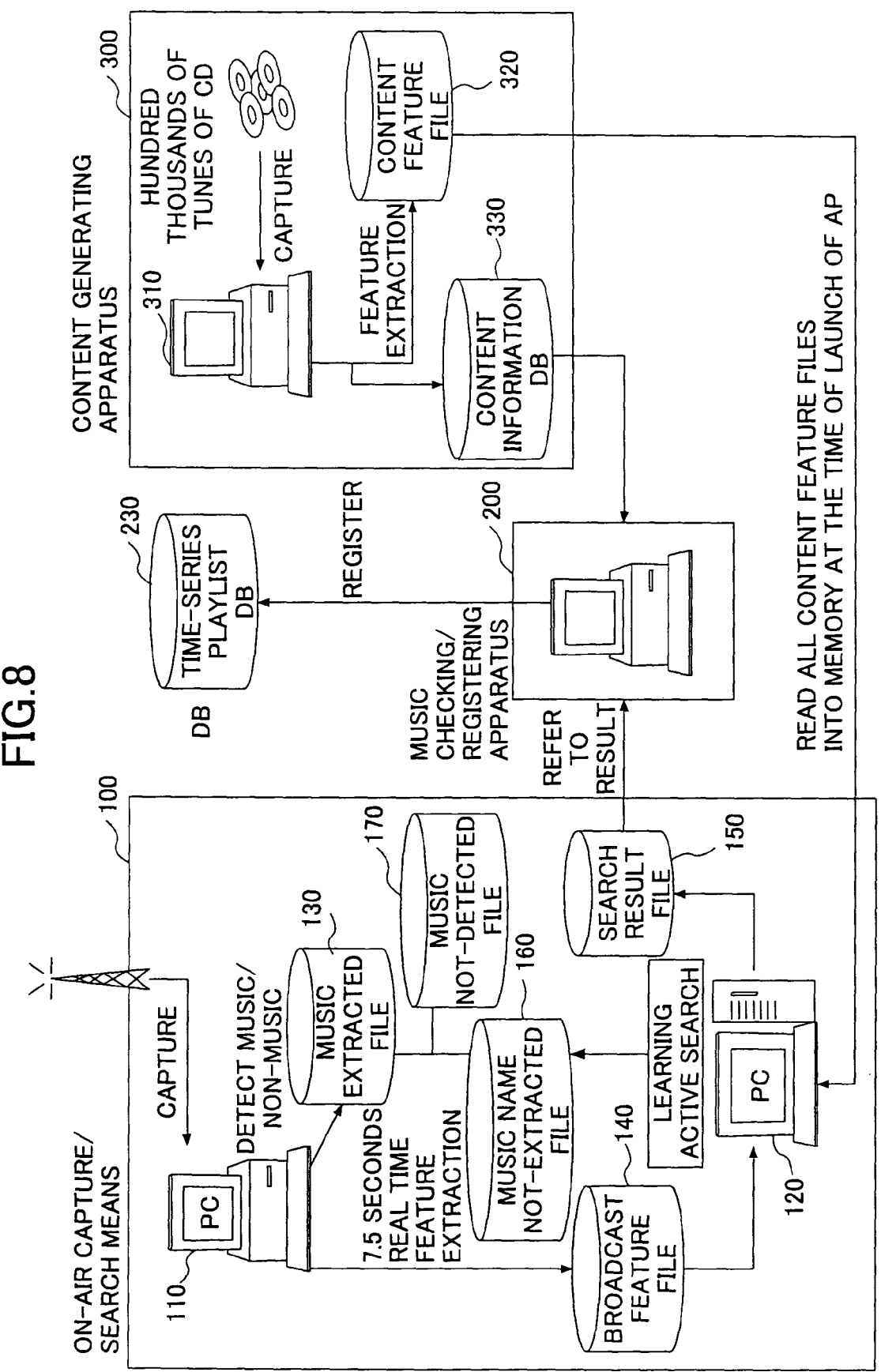
FIG. 8 shows an outline of the music recognizing system of the first example of the present invention.

FIG. 8 shows a configuration of the music recognizing system of the first example of the present invention. In each apparatus shown in the figure, the same numeral is assigned to the same part as that shown in FIG. 3, and the explanation will be omitted.

Figure 9:
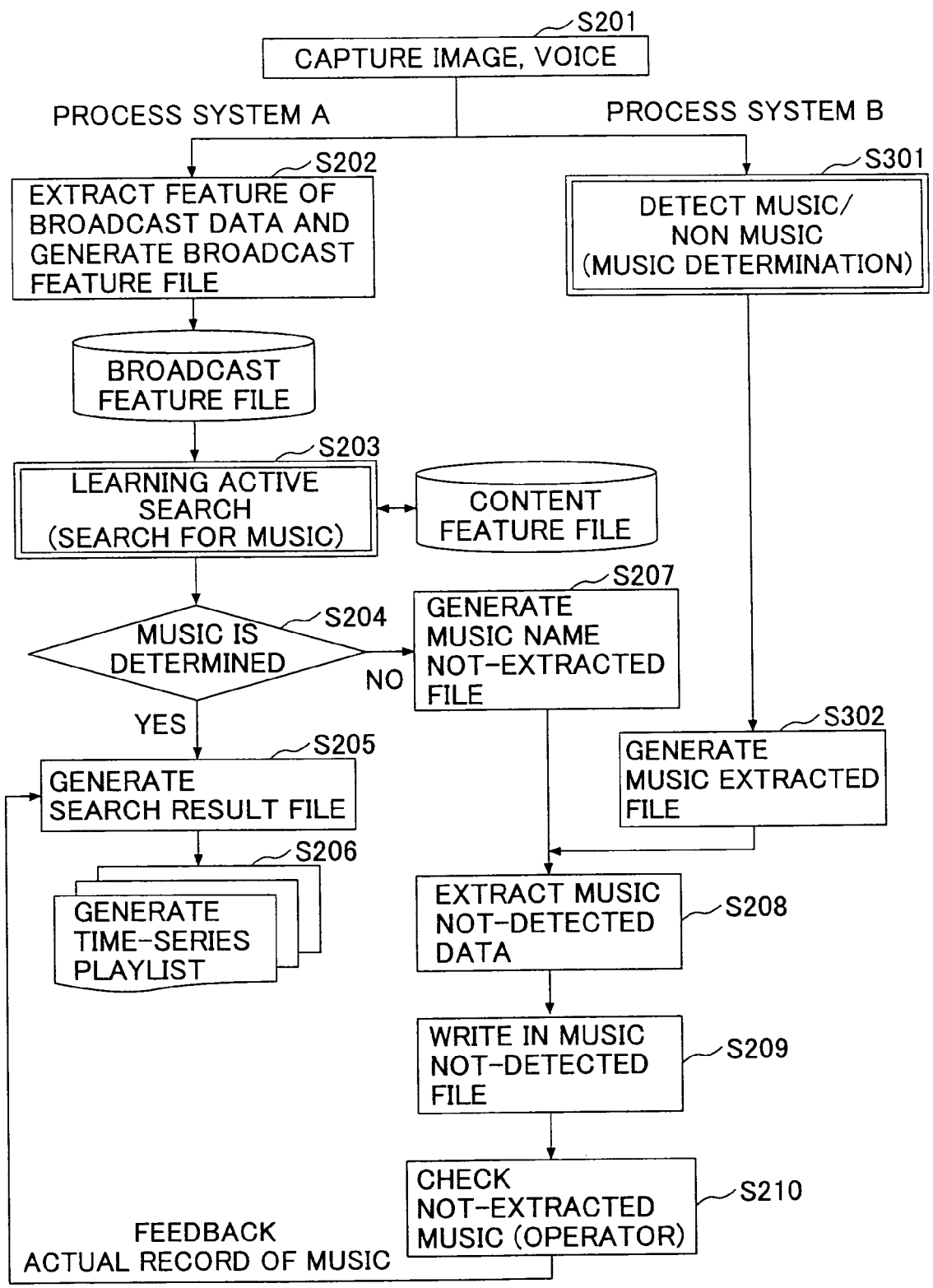
FIG. 9 shows a flowchart of the music recognizing system of the first example of the present invention.

FIG. 9 shows a flowchart of the operation of the music recognizing system of the first example of the present invention. In the following, the music recognizing system of the present invention will be described with reference to FIGS. 8 and 9.

As shown in FIG. 8, the music recognizing system includes an on-air capture/search apparatus 100, a content generating apparatus 300 and a music checking/registering apparatus 200 that are connected. In the on-air capture/search apparatus 100, a PC 110 for capturing broadcasted data in real time and a PC 120 for searching the broadcast feature file 140 are connected. The content generating apparatus 300 includes a PC 310 for managing a content feature file 320 that stores content features of music content and a content information DB 330. The music checking/registering apparatus 200 is for registering a time-series playlist to a DB.

In a processing system A shown in FIG. 9, the PC 110 captures content on the air (step 201), and outputs the broadcast feature file 140 from the captured data at intervals of 7.5 seconds (step 202). Next, the PC 120 obtains data of the music content feature file 320 and the broadcasted feature file 140 on the memory, and the PC 120 searches them for music by using the learning active search (step 203), and outputs a search result to the search result file 150 (step 205). At this time, if the music name is not determined by the search, the feature data is stored in the music name not-extracted file (step 207).

After the above-mentioned processes are completed, the music checking/registering apparatus 200 generates the time-series playlist from the search result of the search result file 150 and the content information DB, and stores it in the DB 230.

In the processing system B shown in FIG. 9, the PC 110 in the on-air capture/search apparatus 100 determines whether the broadcasted data is music or not (step 301). If the data is music, the PC 110 outputs information indicating that the data is music and a time stamp to the music extraction file 130 (step 302). In addition, the music is stored in a WAV file and the like (not shown in the figure) with the time stamp.

Then, the music name not-extracted file 160 (processing system A) and the music extracted file 130 (processing system B) are merged, so that the music name not-detected file 170 for each time can be output (steps 208, 209), and the data can be fed back to the search result file 150 by the operator. Accordingly, the time-series playlist can be complemented.

As for work of the operator, the operator complements necessary data items to the search result file while the operator checks content in the music not-detected file in the PC 120 for searching.

As the content feature file 320 and the broadcast feature file 150, the TAZ file (binary file used for the learning active search) is used.

In the generation of the playlist, the search result file and the content information DB including CM master and the like are connected. As an concrete example, an application example will be described later.

In the example shown in FIG. 8, the PC 110 may capture the broadcasted data of all parts of the country by receiving data from the parts of the country, so that the PC 110 can generate the broadcast feature file. In addition, by placing the PC 110 in each part of the country, each PC 110 may capture broadcasted data at the place and generate a broadcast feature file and send the broadcast feature file to the PC 120 placed in the center.

In the following, an application example of the present invention will be described.

Figure 10:
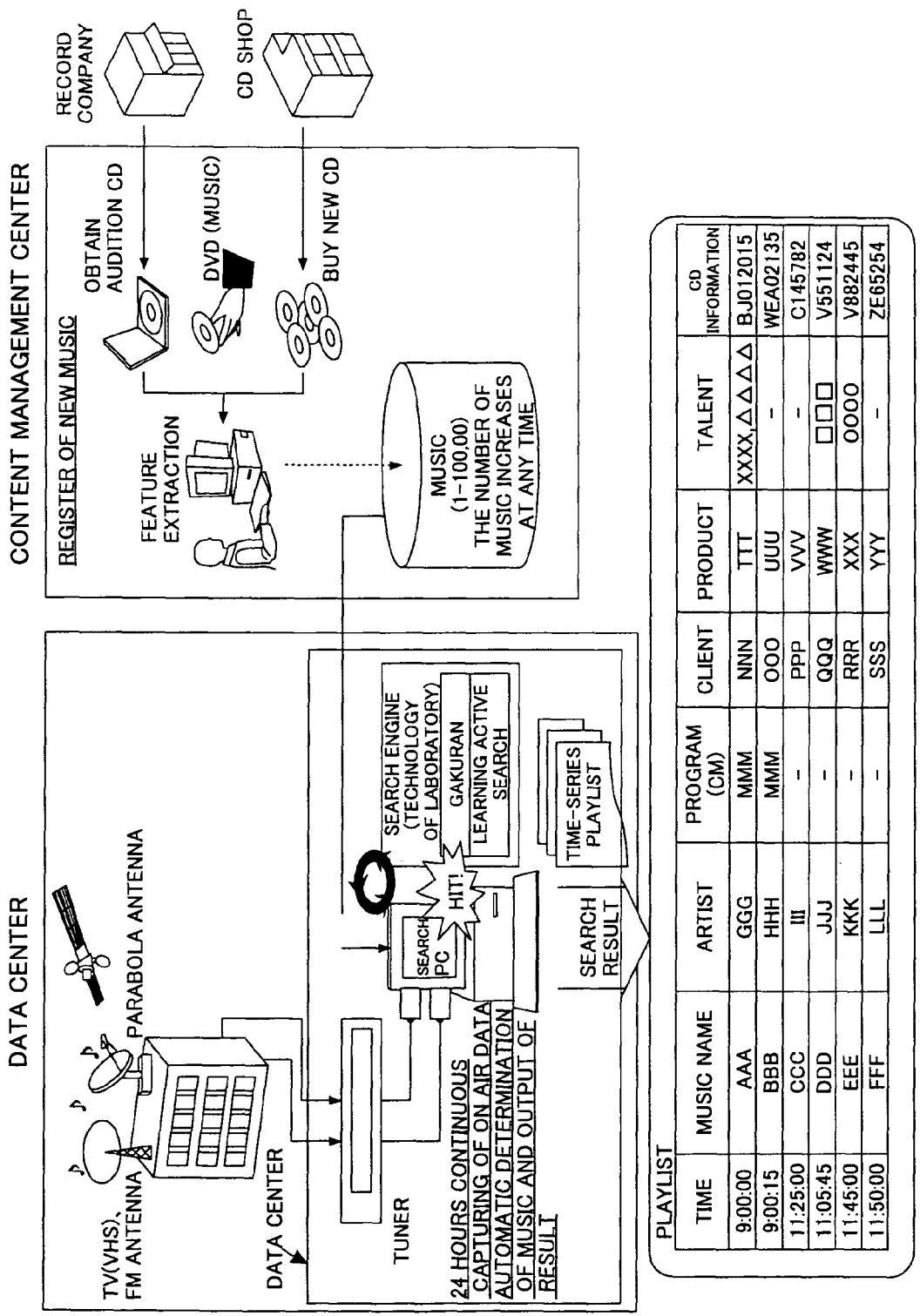
FIG. 10 shows an application example of the first example of the present invention.

FIG. 10 shows the application example of the example of the present invention.

In the figure, the content management center corresponds to the content generating apparatus shown in FIG. 8. The data center corresponds to the on-air capture/search apparatus shown in FIG. 8.

First, the content management center obtains CDs and the like for audition from record companies, buys DVDs and new CDs from CD shops and the like. Then, in the content management center, contents are stored in the content information DB 330 from the recording mediums with attributes of the contents. In addition, features of the contents are extracted and stored in the content feature file 320 (music database in the example of FIG. 10).

Next, for example, the data center obtains, via a tuner, broadcasted content of TV (VHS) or FM and the like obtained via an antenna placed in all parts of the country, or the data center obtains broadcasted content obtained via a parabola antenna from satellite broadcasting and the like. The data center digitizes the obtained broadcasted data at intervals of 7.5 seconds, and extracts features of the data, and stores the features in the broadcast feature file 140. In addition, the data center determines whether the data is music or non-music such as talk and the like, and stores the result in the music extracted file 130.

By using the search engine (leaning active search technique), the PC for searching in the data center searches for music from the content feature file and the broadcast feature file that are obtained beforehand from the content management center, and stores the result in the search result file 150.

Accordingly, the PC used as the music checking/registering apparatus 200 in the data center generates a time-series playlist by using the search result file and the content information DB 330. In the example of FIG. 10, music name, artist, program (CM), client, product, talent, CD information and the like are registered in a database that may be used in a Web site and the like in the order of time (using time stamps provided to the search result file) as the time-series playlist. In addition, as for the music that is not searched for, the music is added by the operator.

Figure 11:
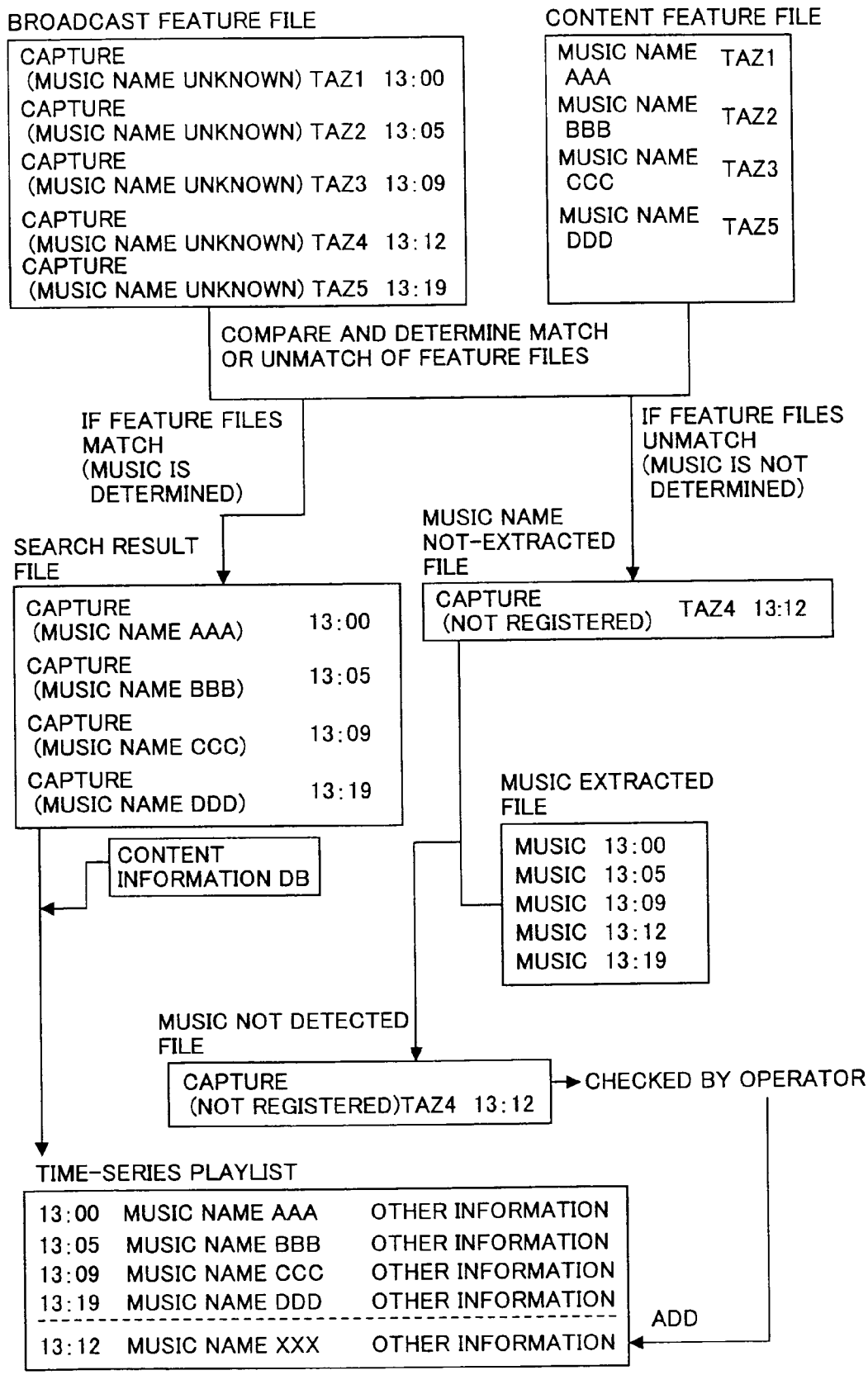
FIG. 11 shows each file used when a time-series playlist is generated and relationships among them.

FIG. 11 shows each file used when the time-series playlist is generated, and relationships among them.

As shown in the figure, the search result file and the music name not-extracted file are generated from the broadcast feature file and the content feature file. Then, the time-series playlist is generated from the search result file and the content information DB.

In addition, the music not-detected file is generated from the music extracted file and the music name not-extracted file and the like. By checking the music name of the music recorded in the file by the operator, the time-series playlist can be complemented. In addition, as for the music in which the music name and the like is recognized, the music can be added to the content feature file as necessary by extracting the feature of the music. Accordingly, when the music corresponding to TAZ 4 is captured, the music can be recognized after this.

Next, a method for generating the time-series playlist shown in FIG. 10 by using the content information DB will be described with reference to FIGS. 12 and 13.

Figure 12:
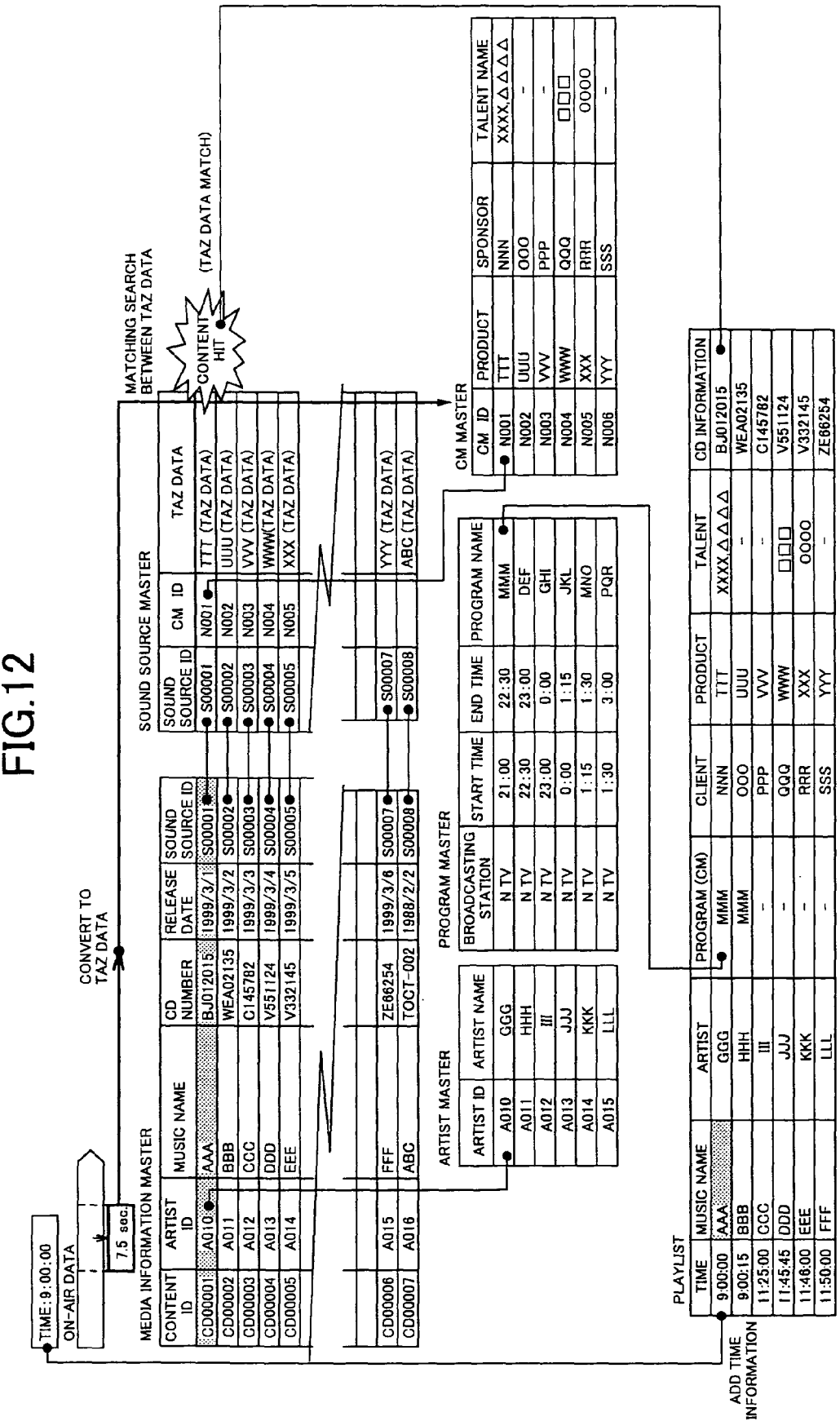
FIG. 12 is a figure for explaining attribute information in the time-series playlist.

FIG. 12 shows a case where each item is determined at 9 o'clock in the playlist. As shown in the figure, the content information DB includes various databases (master databases) associated with the TAZ data. Therefore, if a music name is determined from TAZ data, each information at 9 o'clock can be obtained by pursuing from the voice source master to each master. In addition, the program name can be obtained from the broadcasting station name and the time. Accordingly, the timeseries playlist that includes various related information can be generated.

Figure 13:
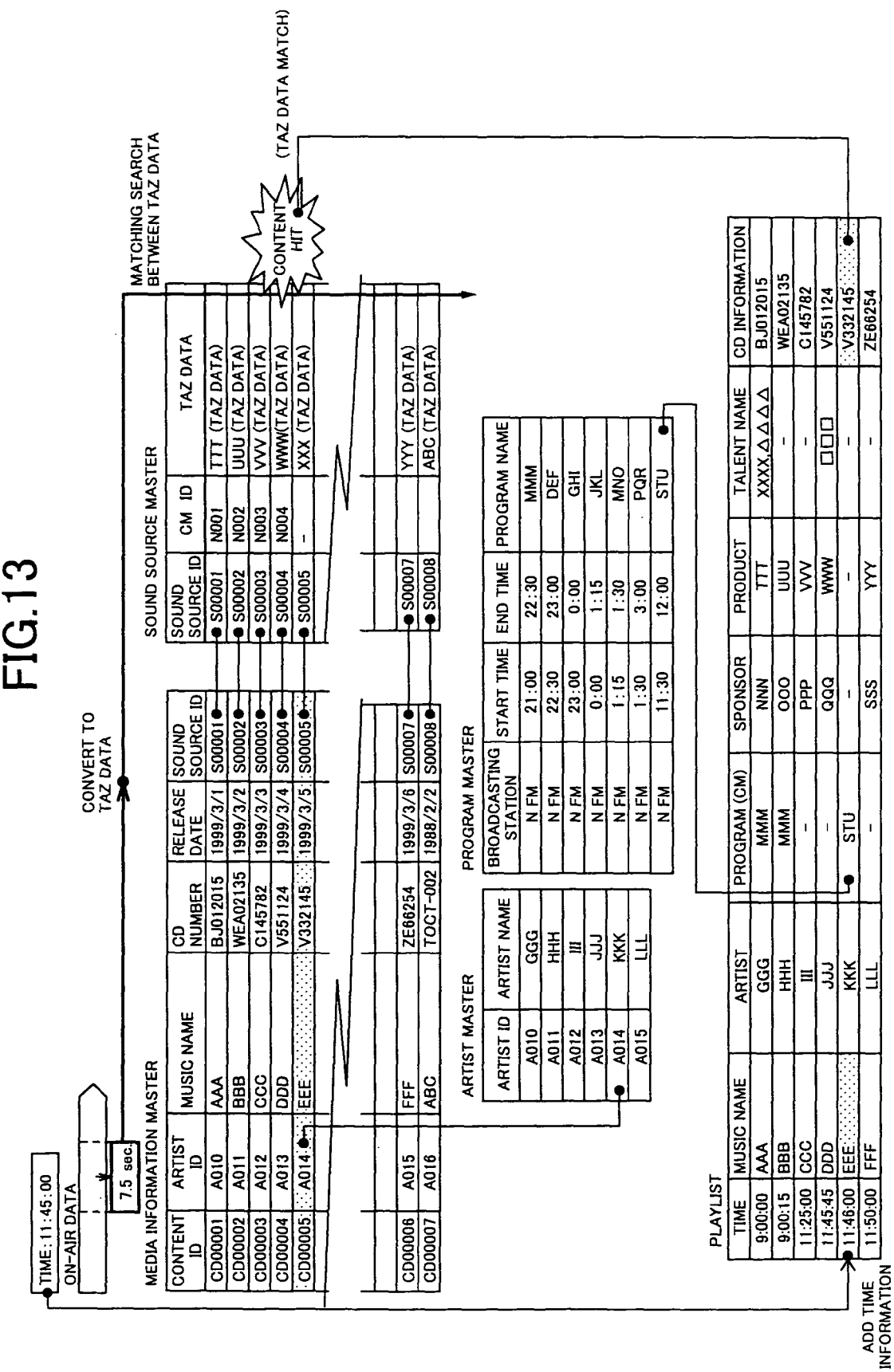
FIG. 13 is a figure for explaining attribute information in the time-series playlist.

FIG. 13 shows a case when the time is 11:46. In the same way mentioned above, various information corresponding to the time can be obtained by using various masters from the TAZ data.

Next, a simulation result of the music recognizing system of the present invention will be described. In the simulation, actuary recorded data of FM broadcasting (about 35 minutes) is used in which 7 pieces of music are included as samples. In addition, 193 pieces of CD music are used as database samples in which 6 pieces of music are included in the above-mentioned broadcasted samples.

As for conditions for the simulation, the broadcasted sample is compared with all 193 pieces for each 7.5 seconds (193 pieces=about 20 hours), in which the specification of the PC server is 1 CPU (Pentium Xeon 933 MHz), 2 GB memory, Linux gcc 291.

As a result of the simulation in the above-mentioned conditions, the 6 pieces that should be detected were detected correctly, the time error was about within 7.5 seconds, and the search is completed in about 45 seconds for the 35 minutes music (2100 seconds). This speed is about 50 times (=2100/45) faster than the actual music speed. By using this speed, processes for about 9000 pieces of music can be expected in actual time.

In addition, although the above example is described on the basis of FIGS. 8 and 9, the process shown in FIG. 9 can be realized by a program, so that the program is stored in a disk apparatus connected to a computer used in the data center and the content management center, or in a portable recording medium such as a floppy disk and a CD-ROM. Then, when the present invention is executed, the program can be installed in the PC used in the data center or the computer management center, so that the present invention can be easily realized.

Example Corresponding to the Second Embodiment
(Second Example)

In this example, a CM is detected in real time from broadcasted data that is being broadcasted, so that the CM is recognized and stored. As mentioned before, by using the thus stored CM data as the above-mentioned master file, the time-series playlist including information on the CM can be generated.

Figure 14:
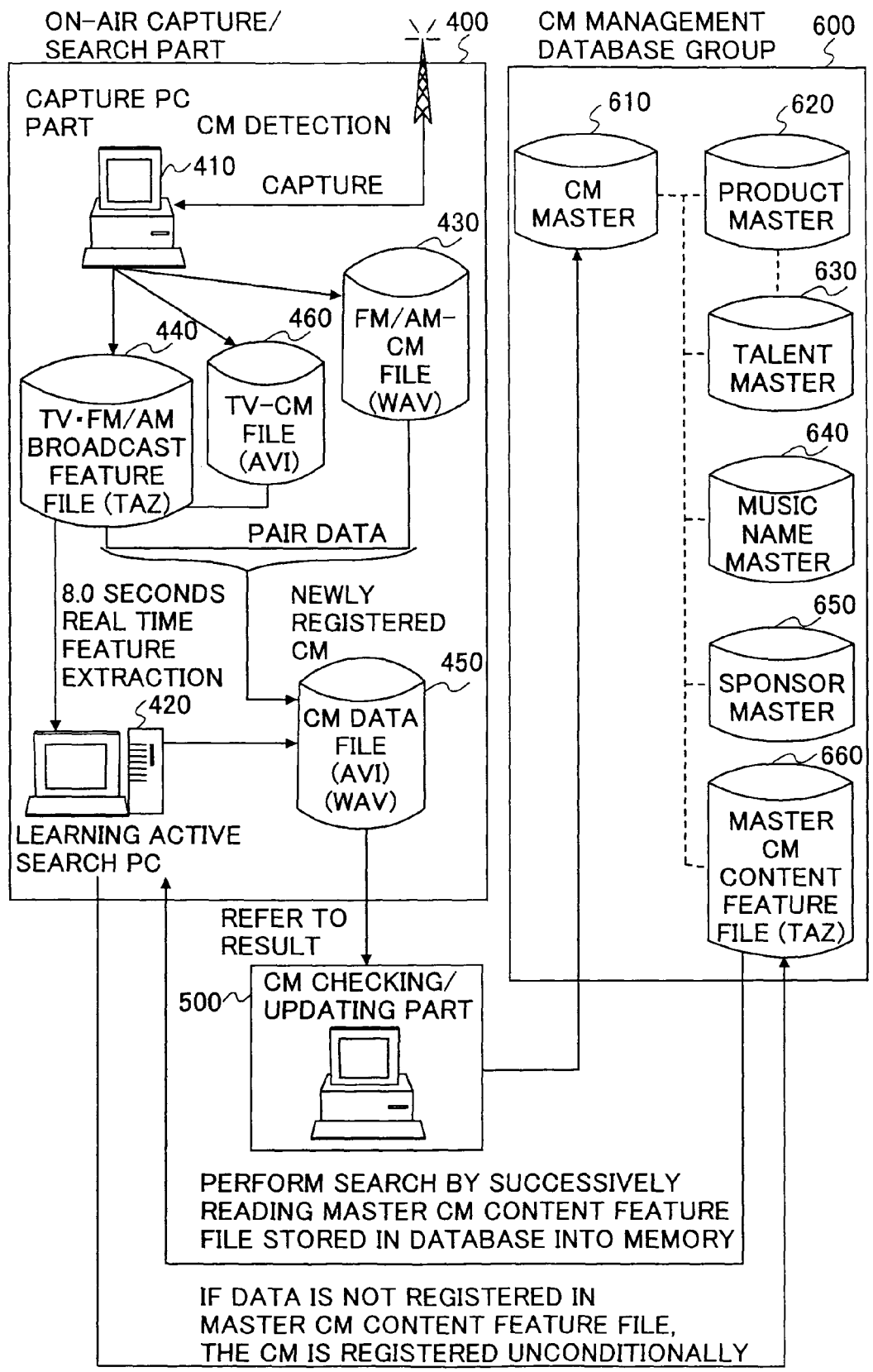
FIG. 14 shows an outline of a CM recognizing system of the second example of the present invention.

FIG. 14 shows a configuration of the CM recognizing system of the second example of the present invention. In the configuration elements, the same numeral is assigned to the same configuration part as that of FIG. 5, and the explanation will be omitted.

In the CM recognizing system of this example, the CM recognizing system includes a capture PC part 410, an on-air capture/search part 400, a CM checking/updating part 500, and a CM management database 600. The capture PC part 410 captures broadcasted content. The on-air capture/search part 400 includes a learning active search PC 420 for comparing the broadcast feature file 440 and a master CM content feature file 660. The CM checking/updating part 500 is used for checking a CM and for updating processes. The CM management database 600 manages various master files of the CM.

In the following, the file format in FIG. 14 will be described.

The broadcast feature file 440 is a file of TAZ format in which features of both of TV-CM and FM/AM-CM extracted in real time are stored. The TV-CM file 460 is a file of AVI format in which TV-CM is stored, and the TV-CM file 460 is managed in pairs with content of the broadcast feature file 440.

The FM/AM-CM file 430 is a file of WAV format in which FM/AM-CM is stored, and is managed in pairs with content of the broadcast feature file 440.

The CM data file 450 is a file in which a CM to be newly registered is stored. When the CM is TV-CM, the data is stored as an AVI format for example. When the CM is FM/AM-CM, the data is stored as a WAV format.

The master CM content feature file in the CM management database group 600 is stored as the TAZ format.

In the following, the operation in the above-mentioned configuration will be described with reference to FIGS. 6 and 7.

The capture PC 410 captures content on the air (step 301). Next, the capture PC 410 obtains the start and the end of the CM by using a CM detection module. As a technique for the CM detection module, a technique disclosed in Japanese patent application No. 6-312976 "image cut point detection method and apparatus" (Tanimura, Tonomura) can be used.

Figure 15:
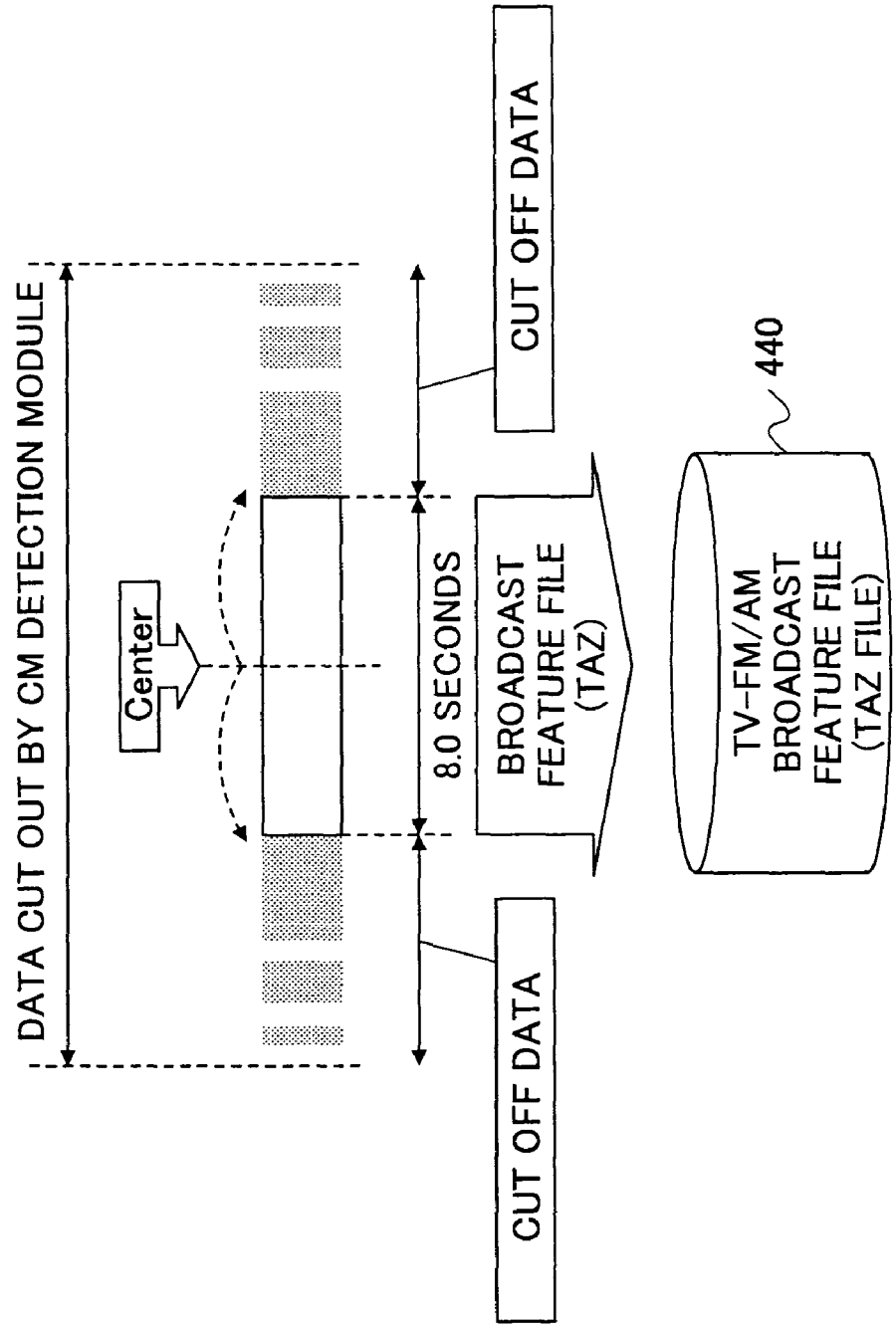
FIG. 15 is a figure for explaining a cutting method for extracting features of CM data.

Next, the cut-out CM data is reprocessed in which the CM data is cut-out into a predetermined length (8.0 seconds) such that the length from the center of the CM data to one end is the same as the length from the center to another end as shown in FIG. 15 in order to absorb an error of cut points cut by the CM detection module. The feature of the reprocessed CM data is extracted as the broadcast feature (step 302), and the broadcast feature is stored in the broadcast feature file 440 (step 303).

The capture PC 410 stores data on the air by using the CM detection module (steps 304, 305 and 306). When the data on the air is TV, the data is stored as the AVI format, and when the data is FM/AM, the data is stored as the WAV format.

Next, the learning active search PC 420 reads the broadcast feature file 440 and the master CM content feature file 660 of the CM management database group 600 in the memory, so that the learning active search is performed (step 307). If a piece of data of the broadcast feature file 440 is not registered in the CM content feature file 660, the corresponding CM is registered in the CM data file 450 (step 309). In addition, if the data in the broadcast feature file 440 is not registered in the CM content feature file 660, the data is registered in the master CM content feature file 660 unconditionally.

Next, checking of the CM registered in the CM data file 450 is performed in the CM checking/updating part 500 (step 310). The checking of the CM is performed by using an existing software. The CM is finally registered in the CM master 610 by adding various additional information by the operator. Further, by using attributes of the CM registered in the CM master 610, the product master 620, the talent master 630, the music name master 640, the sponsor master 650, the master CM content feature file 660 are updated by corresponding data (step 311).

In the above-mentioned example, although the above example is described on the basis of flowcharts in FIGS. 6 and 7, the process shown in FIG. 6 can be realized by a program, so that the program is stored in a disk apparatus connected to a computer used in the on-air capture/search apparatus, or stored in a portable recording medium such as a floppy disk and CD-ROM and the like. Then, when the present invention is executed, the program can be installed in the PC (capture PC, learning active search PC) used in the on-air capture/search apparatus, so that the present invention can be easily realized.

In the above example, although processes are shown in which broadcasted data on the air from a broadcasting station of TV, FM/AM and the like is captured, and recognized and stored, the present invention is not limited to this example. The same processes as the above-mentioned processes can be applied to data transmitted via a communication network such as the Internet and the like.

In the above example, although the feature of the music is extracted at intervals of 7.5 seconds and the feature of CM is extracted at intervals of 8 seconds, these are merely examples and the present invention is not limited to these examples.

Example Corresponding to the Third Embodiment
(Third Example)

Next, an example will be described in which, while the playlist is generated in the same way as the first example by capturing music and CM, data is registered in the content generating part in the same way as the second example.

Figure 16:
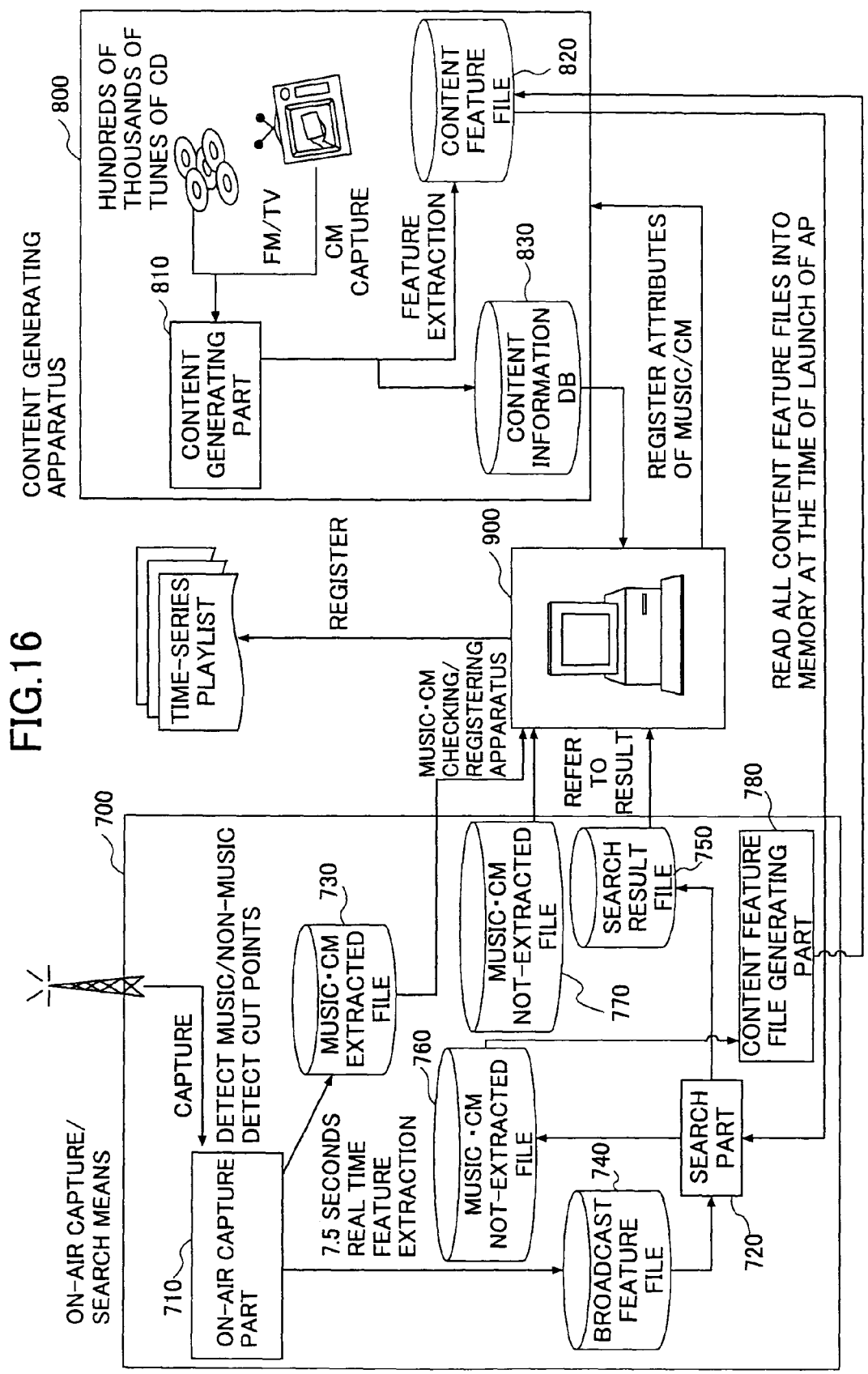
FIG. 16 shows a system configuration in the third example of the present invention.

FIG. 16 shows a system configuration in the third example.

As shown in FIG. 16, the music/CM recognizing system in the third example includes a capture part/search apparatus 700, a content generating apparatus 800, and a music/CM checking/registering apparatus 900. The capture part/search apparatus 700 captures broadcasted content and searches for music and CM. The content generating apparatus 800 generates a content information DB. The music CM checking/registering apparatus 900 generates the time-series playlist from the search result file and the content information DB, and registers attribute information of newly recognized music and CM in the content generating apparatus 800.

The on-air capture/search apparatus 700 includes an on-air capture part 710, a search part 720, a music/CM extracted file 730, a broadcast feature file 740, a search result file 750, a music/CM not-extracted file 760, a music/CM not-detected file 770, and a content feature file generating part 780. The content generating apparatus includes a content generating part 780, a content feature file 820 and a content information DB 830.

Figure 17:
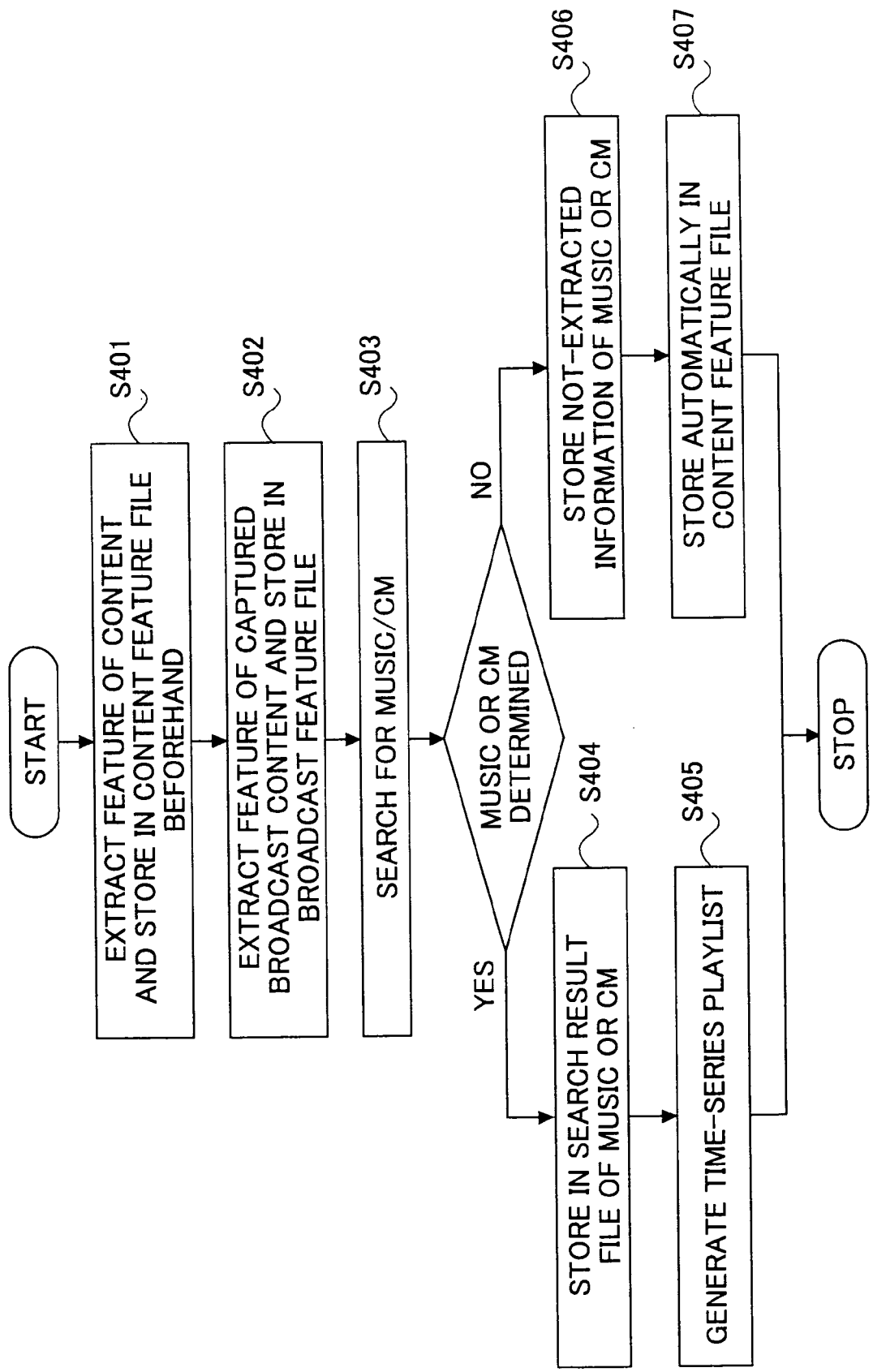
FIG. 17 is a flowchart showing operation outline of the system shown in FIG. 16.

FIG. 17 is a flowchart showing outline operation of the system shown in FIG. 16. The outline operation will be described with reference to FIG. 17.

The content generating apparatus 800 extracts features of music and CM, and stores the features as the content feature file (step 401). In the on-air capture/search apparatus 700, the on-air capture part 710 captures broadcasted content including music and CM and stores the content as the AVI file, WAV file and the like, and extracts features of the content, and stores the feature in the broadcast feature file 740 (step 402). Next, music and CM are searched for by using the content feature file 820 and the broadcast feature file 740 (step 403). When the music or the CM is determined, information on the music or the CM is stored in the search result file (step 404), so that the time series playlist is generated (step 405). If the music or the CM is not determined, the feature data by which the music or the CM is not determined is stored in the music/CM not-extracted file (step 406). Then, a content feature file corresponding to the music or the CM is generated, so that the content feature file is automatically registered in the content feature file 820 in the content generating apparatus 800 (step 407).

Next, the above-mentioned processes will be described in more detail by using a flowchart of the processes in the on-air capture part/search apparatus 700 shown in FIG. 18.

Figure 18:
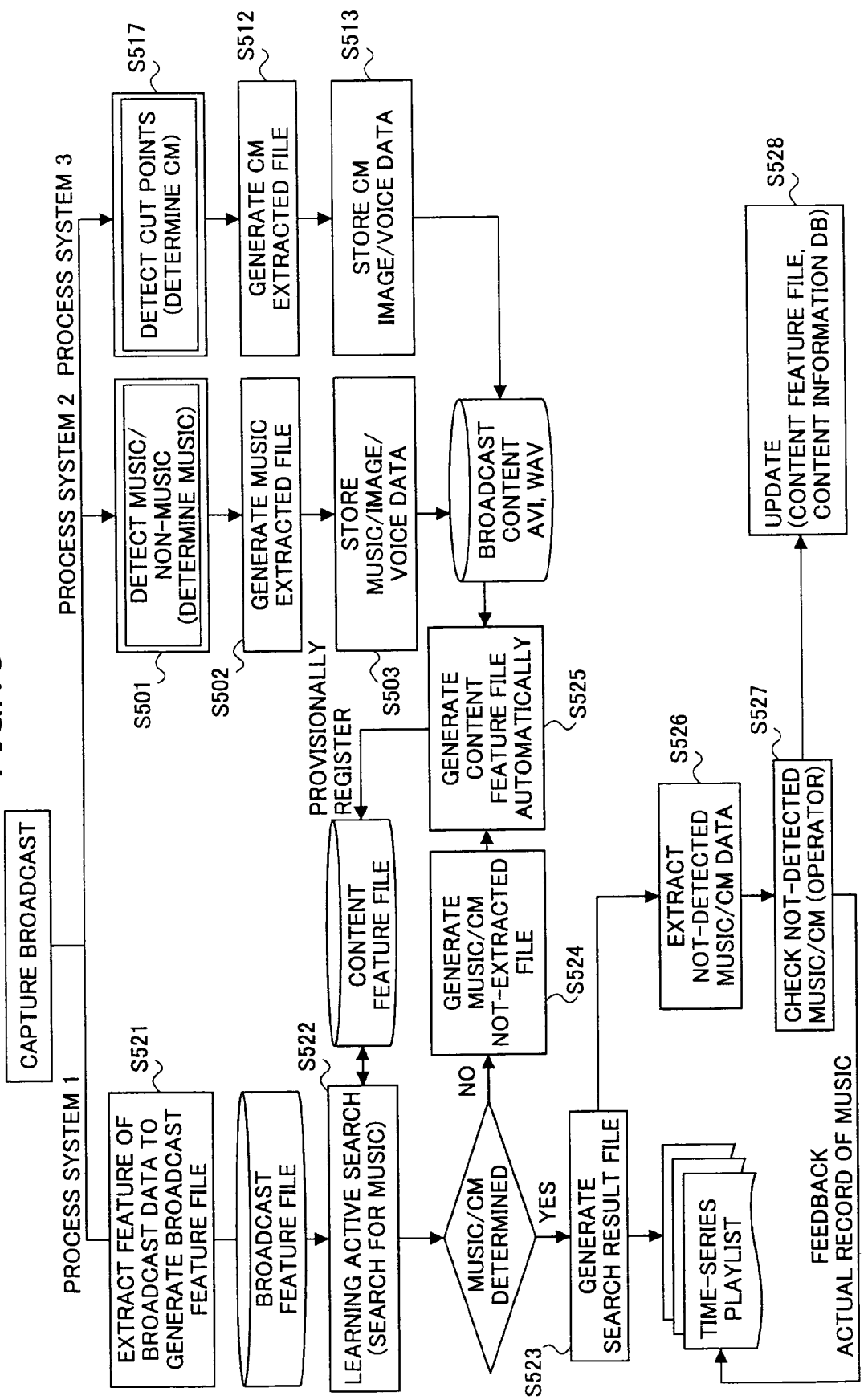
FIG. 18 is a flowchart showing the operation of the system in the third example of the present invention.

As shown in FIG. 18, the processes by the on-air capture part/search apparatus 700 in this example can be divided into a process system 1 for performing search for music and CM, a process system 2 for performing music detection, music determination and storing, and a process system 3 for performing CM detection and storing.

Figure 19:
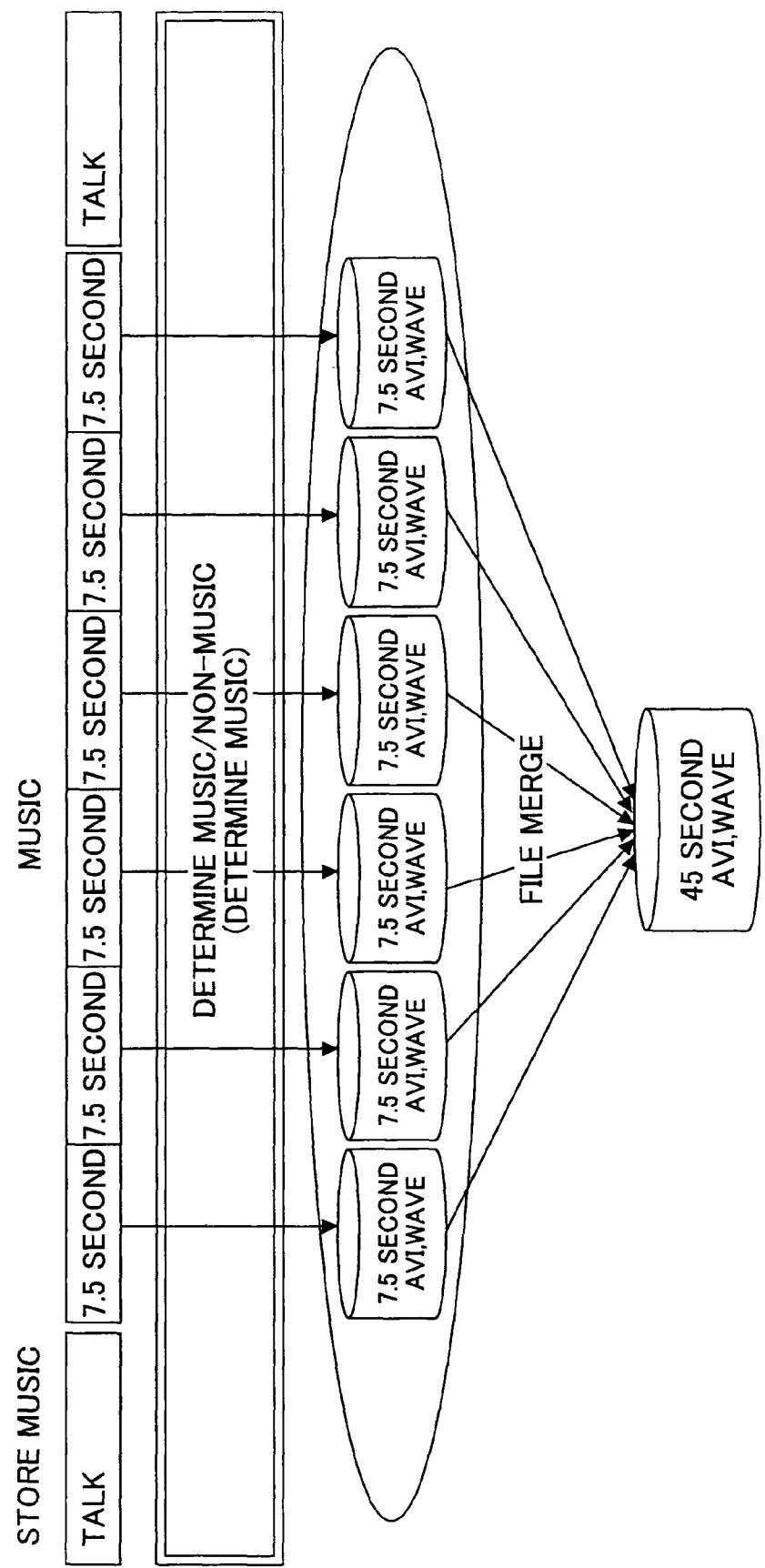
FIG. 19 shows a storing method of music data.

In the process system 2, in the same way as the first example, it is determined whether the broadcast content is music or not, a music extracted file is generated, and music data is stored as a WAV file and the like (steps 501-503). FIG. 19 shows a storing method of music data. Accordingly, the part determined to be music is stored at intervals of 7.5 seconds.

Figure 20:
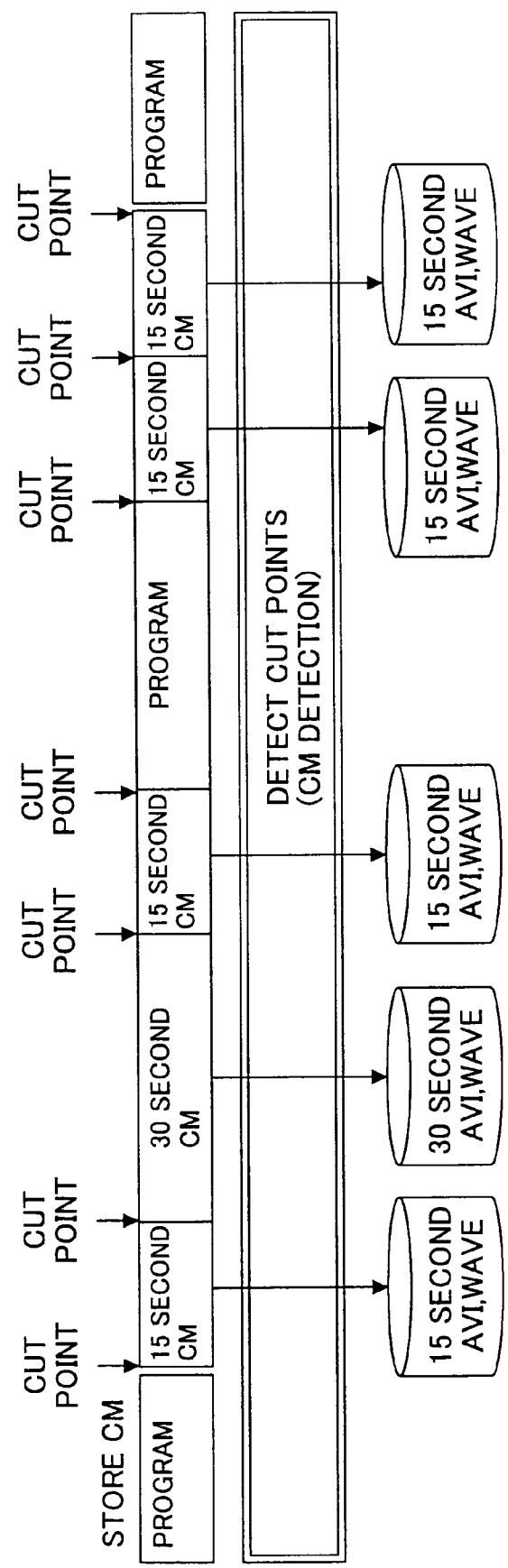
FIG. 20 shows a storing method of CM data.

In the process system 3, in the same way as the second example, the CM extracted file is generated by detecting cut points in broadcasted data, and the CM data is stored as the AVI file and the like (steps 511-513). FIG. 20 shows the manner. Accordingly, the CM part between the cut points is stored.

The CM extracted file is similar to the music extracted file in music. In the CM extracted file, information indicating that the data is CM and the time are recorded.

In the process system 1, in the same way as the first example as for music, and in the same way as the second example as for CM, the feature is extracted and music or CM is searched for (steps 521, 522).

When a name of music or CM is determined, the search result file 750 is generated (step 523). If the name of music or CM is not determined, the data is stored in the music/CM not-extracted file (step 524), and the content feature file is automatically generated by using the data (step 525), so as to be provisionally registered in the content feature file 520.

FIG. 21 shows processes for generating the content feature file from the music/CM not-extracted file. Accordingly, the content feature file is generated from data files (AVI or WAV) of music or CM corresponding to data in the music/CM not-extracted file.

In the same way as the first example, the music/CM not-detected file is generated from the music/CM not-extracted file and the music/CM extracted file and the like (step 526). The operator checks the music or the CM and the time-series playlist is complemented by the recognized music or CM (step 527). Further, by using the result of checking, various databases in the content generating apparatus are updated (music name, artist name and the like are associated with a TAZ file), so that the provisionally registered content feature file is formally registered (step 528).

By performing the above-mentioned processes, data of the content feature file from which the playlist can be generated can be added and information on music and CM can be registered, while the time-series playlist is generated.

As mentioned above, according to the present invention for recognizing music in real time, broadcasted data on the air (music and the like used for CM) is digitized and the feature is extracted at intervals of 7.5 seconds, and the feature is compared with the content feature file prepared beforehand, so that the music name can be stored in a storage with information of time when the music is broadcasted as the time-series list. Accordingly, the time-series playlist can be obtained in which music name, artist name, program (CM), client, product, talent, CD information and the like are included, so that meaningful information result can be obtained. This information can be utilized as marketing information for a sales target.

As for the reason for digitizing the data at intervals of 7.5 seconds for extracting the feature, since the time for broadcasting a CM is generally 15 seconds at the minimum currently, a half of 15 seconds is used for the interval for digitizing and extracting feature for performing search with reliability. Therefore, the time interval for digitizing can be changed from 7.5 seconds to other value according to the kind of content.

In addition, the CMs are conventionally monitored manually for extraction. On the other hand, according to the present invention, it becomes possible to automatically recognize CMs. In addition, CM data on the air in TV and FM/AM can be registered without tag information or watermark information. The CM data can be used for generating the time-series playlist.

In addition, according to the present invention, since data in which music name and the like can not be determined can be automatically registered in the content generating apparatus in the process for generating the time-series playlist, data in the database in the content generating apparatus can be expanded, so that more accurate time-series playlist can be generated.

The present invention is not limited to the specifically disclosed embodiments, and variations and modifications may be made without departing from the scope of the invention.

The invention claimed is:

1. A music recognizing method for recognizing music from received data, the method comprising the steps of:
   extracting features of music content beforehand, storing the features and corresponding music names in a content feature file;
   extracting a feature from the received data, and storing the feature and a time in a broadcast feature file;
   searching for a music name of the feature in the broadcast feature file by comparing data in the content feature file and data in the broadcast feature file, wherein the music name corresponds to a feature, in the content feature file, the same as the feature in the broadcast feature file;
   when the music name is determined, the music name and the time corresponding to the feature, in the broadcast feature file, that corresponds to the music name are stored in a search result file; and
   generating a time-series playlist of music using the search result file and a content information database (DB) including information associated with the music name, wherein the time-series playlist includes the time, the music name of music broadcasted at the time and information associated with the music name.

2. The music recognizing method as claimed in claim 1, the method further comprising the steps of:
   determining whether the received data is music or not;
   if the data is music, storing information indicating that the data is music and the time when the data is received in a music extracted file;
   if a music name for data in the broadcast feature file is not determined in the step of searching for music, storing the data in a music name not-extracted file; and
   generating a music not-detected file from the broadcast feature file, the music extracted file and the music name not-extracted file.

3. The music recognizing method as claimed in claim 2, the method further comprising the steps of:
   making the music stored in the music not-detected file to be listened to by a person;
   adding a music name and a time of the music stored in the music not-detected file in the playlist.

4. The music recognizing method as claimed in claim 1, the method comprising the steps of:
   receiving broadcasted data in a plurality of areas;
   sending data received in each area to a center system;
   generating the time-series playlist by using the music recognizing method in the center system.

5. The music recognizing method as claimed in claim 1, wherein each of the content information DB and the information related to the music name includes information related to a commercial (CM), and the information related to the CM in the content information DB is registered in the content information DB beforehand by the CM recognizing method, the CM recognizing method further comprising the steps of:
   detecting CM data from the received data;
   extracting features of the CM data, and storing the features in the broadcast feature file;
   performing data comparison between the broadcast feature file and a master CM content feature file in which features of CM content are stored beforehand; and
   if data in the broadcast feature file does not exist in the master CM content feature file, registering the data in the master CM content feature file included in the content information DB as a new CM.

6. A music recognizing method for recognizing music from received data, the method comprising the steps of:
   extracting features of music content beforehand, storing the features and corresponding music names in a content feature file;
   receiving broadcasted data in a plurality of areas;
   extracting a feature from the received data, and sending the feature and a time as data of a broadcast feature file to a center system in each area;
   in the center system, searching for music name of the feature in the broadcast feature file by comparing data in the content feature file and data in the broadcast feature file, wherein the music name corresponds to a feature, in the content feature file, the same as the feature in the broadcast feature file;
   when the music name is determined, the music name and the time corresponding to the feature, in the broadcast feature file, that corresponds to the music name are stored in a search result file; and
   generating a time-series playlist of music using the search result file and a content information database including information associated with the music name, wherein the time-series playlist includes the time, the music name of music broadcasted at the time and information associated with the music name.

7. A commercial (CM) recognizing method for recognizing CM data from received data, and storing the recognized CM data, the method comprising the steps of:
   detecting the CM data from the received data;
   extracting features of the CM data, and storing features in a broadcast feature file;
   performing data comparison between the broadcast feature file and a master CM content feature file in which features of CM content are stored beforehand; and
   if data in the broadcast feature file does not exist in the master CM content feature file, registering the data in the master CM content feature file as a new CM,
   the step of detecting the CM data from the received data comprising the steps of:
   detecting a start point and an end point of the CM data, by using a CM detecting module for detecting cut points in images; and
   cutting out a part of the CM data to obtain a predetermined length such that a length from the center of the CM data to an end is the same as a length from the center to another end so as to extract the features of the CM data from the part of the predetermined length in the extracting step.

8. The CM recognizing method as claimed in claim 7, the method further comprising the steps of:
   displaying CM data that does not exist in the master CM content feature file as a result of the data comparison; and
   registering information relating to the CM data in each database in a CM management database group including the master CM content feature file.

9. A music recognizing system for recognizing music from received data, the system comprising:
   means for obtaining data of a content feature file in which features and corresponding music names of music content are stored;
   means for extracting a feature from the received data, and storing the feature and a time in a broadcast feature file;
   means for searching for a music name of the feature in the broadcast feature file by comparing data in the content feature file and data in the broadcast feature file, wherein the music name corresponds to a feature, in the content feature file, the same as the feature in the broadcast feature file;

means for, when the music name is determined, storing the music name and the time corresponding to the feature, in the broadcast feature file, that corresponds to the music name in a search result file; and means for generating a time-series playlist of music using the search result file and a content information database including information associated with the music name, wherein the time-series playlist includes the time, the music name of music broadcasted at the time and information associated with the music name.

10. The music recognizing system as claimed in claim 9, the system further comprising:

means for determining whether the received data is music or not;

means for, if the data is music, storing information indicating that the data is music and the time when the data is received in a music extracted file;

means for, if a music name of data in the broadcast feature file is not determined, storing the data in a music name not-extracted file; and means for generating a music not-detected file from the broadcast feature file, the music extracted file and the music name not-extracted file.

11. The music recognizing system as claimed in claim 10, the system further comprising:

means for making the music stored in the music not-detected file to be listened to by a person;

means for adding a music name and a time on the music stored in the music not-detected file in the playlist.

12. A music recognizing system for recognizing music from received data, the system comprising:

a plurality of apparatuses for receiving broadcasted data in a plurality of areas;

a center system for receiving data received in each area from each apparatus, the center system comprising:

means for obtaining data of a content feature file in which features and corresponding music names of music content are stored;

means for extracting feature from the received data, and storing the feature and a time in a broadcast feature file;

means for searching for a music name of the feature in the broadcast feature file by comparing data in the content feature file and data in the broadcast feature file, wherein the music name corresponds to a feature, in the content feature file, the same as the feature in the broadcast feature file;

means for, when the music name is determined, storing the music name and the time corresponding to the feature, in the broadcast feature file, that corresponds to the music name in a search result file; and means for generating a time-series playlist of music using the search result file and a content information database including information associated with the music name, wherein the time-series playlist includes the time, the music name of music broadcasted at the time and information with the music name.

13. A music recognizing system for recognizing music from received data, the system comprising:

a plurality of apparatuses for receiving broadcasted data and extracting features of the broadcasted data in a plurality of areas;

a center system for receiving the features of data received in each area from each apparatus, the center system comprising:

means for obtaining data of a content feature file in which features and corresponding music names of music content are stored;

means for extracting a feature from the received data, and storing the feature and a time in a broadcast feature file;

means for searching for a music name of the feature in the broadcast feature file by comparing data in the content feature file and data in the broadcast feature file, wherein the music name corresponds to a feature, in the content feature file, the same as the feature in the broadcast feature file;

means for, when the music name is determined, storing the music name and the time corresponding to the feature, in the broadcast feature file, that corresponds to the music name in a search result file; and means for generating a time-series playlist of music using the search result file and a content information database including information associated with the music name, wherein the time-series playlist includes the time, the music name of music broadcasted at the time and information with the music name.

14. A commercial (CM) recognizing system for recognizing CM data from received data, and storing the recognized CM data, the system comprising:

means for detecting the CM data from the received data;

means for extracting features of the CM data, and storing the features in a broadcast feature file;

means for performing data comparison between the broadcast feature file and a master CM content feature file in which features of CM content are stored beforehand; and means for, if data in the broadcast feature file does not exist in the master CM content feature file, registering the data in the master CM content feature file as a new CM;

the means for detecting the CM data from the received data comprising means for detecting a start point and an end point of the CM data by using a CM detection module for detecting cut points in images; and cutting out a part of the CM data to obtain a predetermined length such that a length from the center of the CM data to an end is the same as a length from the center to another end so as to extract the features of the CM data from the part of the predetermined length in the extracting step.

15. The CM recognizing system as claimed in claim 14, the system further comprising:

means for displaying CM data that does not exist in the master CM content feature file as a result of the data comparison; and means for registering information relating to the CM data in each database in a CM management database group including the master CM content feature file.

16. A computer readable medium recording program code for causing a computer to perform processes for recognizing music from received data, the computer readable medium comprising:

program code means for extracting a feature and a time from the received data, and storing the feature and a time in a broadcast feature file;

program code means for searching for a music name of the feature in the broadcast feature file by comparing data in a content feature file, in which features and corresponding music names of music content are stored, and data in the broadcast feature file, wherein the music name corresponds to a feature, in the content feature file, the same as the feature in the broadcast feature file;

program code means for, when the music name is determined, storing the music name and the time corresponding to the feature, in the broadcaste feature file, that corresponds to the music name in a search result file; and program code means for generating a time-series playlist of music using the search result file and a content information database including information associated with the music name, wherein the time-series playlist includes the time, the music name of music broadcasted at the time and information with the music name.

17. The computer readable medium as claimed in claim 16, the computer readable medium further comprising:

program code means for determining whether the received data is music or not;

program code means for, if the data is music, storing information indicating that the data is music and the time when the data is received in a music extracted file;

program code means for, if a music name of the data in the broadcast feature file is not determined, storing the data in a music name not-extracted file; and program code means for generating a music not-detected file from the broadcast feature file, the music extracted file and the music name not-extracted file.

18. The computer readable medium as claimed in claim 17, the computer readable medium further comprising:

program code means for making the music stored in the music not-detected file to be listened to by a person;

program code means for adding a music name and a time on the music stored in the music not-detected file in the playlist.

19. A computer readable medium recording program code for causing a computer to perform processes for recognizing music from received data, the computer readable medium comprising:

program code means for receiving a feature and a time of broadcasted data received in each area as a broadcast feature file from each apparatus;

program code means for searching for a music name by comparing data in a content feature file, in which features and corresponding music names of music content are stored, and data in the broadcast feature file, wherein the music name corresponds to a feature, in the content feature file, the same as the feature in the broadcast feature file;

program code means for, when the music name is determined, storing the music name and the time corresponding to the feature, in the broadcast feature file, that corresponds to the music name in a search result file; and program code means for generating a time-series playlist of music using the search result file and a content information database including information associated with the music name, wherein the time-series playlist includes the time, the music name of music broadcasted at the time and information with the music name.

20. A computer readable medium recording program code for causing a computer to perform processes for recognizing commercial (CM) data from received data, and storing the recognized CM data, the computer readable medium comprising:

program code means for detecting the CM data from the received data;

program code means for extracting features of the CM data, and storing the features in a broadcast feature file;

program code means for performing data comparison between the broadcast feature file and a master CM content feature file in which features of CM content are stored beforehand; and program code means for, if data in the broadcast feature file does not exist in the master CM content feature file, registering the data in the master CM content feature file as a new CM;

the program code means for detecting the CM data from the received data comprising;

program code means for detecting a start point and an end point of the CM data by using a CM detection module for detecting cut points in images; and cutting out a part of the CM data to obtain a predetermined length such that a length from the center of the CM data to an end is the same as a length from the center to another end so as to extract the features of the CM data from the part of the predetermined length in the extracting step.

21. The computer readable medium as claimed in claim 20, the computer readable medium further comprising:

program code means for displaying CM data that does not exist in the master CM content feature file as a result of the data comparison; and program code means for registering information relating to the CM data in each database in a CM management database group including the master CM content feature file.

* * * * *